(12) United States Patent
Komata

(10) Patent No.: US 7,671,846 B1
(45) Date of Patent: *Mar. 2, 2010

(54) COMPUTER SYSTEM HAVING A PRESSURE-SENSITIVE CONTROLLER, SETUP METHOD FOR A PRESSURE-SENSITIVE CONTROLLER AND RECORDING MEDIUM THAT RECORDS THIS METHOD

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 2462 days.

This patent is subject to a terminal disclaimer.

(21) Appl. No.: 09/758,033

(22) Filed: Jan. 10, 2001

(30) Foreign Application Priority Data

Jan. 14, 2000 (JP) ............................. 2000-040257

(51) Int. Cl.
 *G06F 3/41* (2006.01)
 *G06F 17/00* (2006.01)
(52) U.S. Cl. ............................. 345/173; 463/36; 463/37
(58) Field of Classification Search ................ 345/156, 345/157, 168–174, 159, 636; 463/1, 16, 463/20, 25–27, 30–47, 7, 6; 178/19.04; 348/E5.02
See application file for complete search history.

(56) References Cited

U.S. PATENT DOCUMENTS

| 5,184,120 | A | 2/1993 | Schultz | |
|---|---|---|---|---|
| 6,302,790 | B1 * | 10/2001 | Brossard | 463/20 |
| 6,322,448 | B1 * | 11/2001 | Kaku et al. | 463/1 |
| 6,347,997 | B1 * | 2/2002 | Armstrong | 463/37 |
| 6,402,616 | B1 * | 6/2002 | Ogata et al. | 345/156 |
| 6,422,943 | B2 * | 7/2002 | Shinohara et al. | 463/37 |
| 6,524,187 | B2 * | 2/2003 | Komata | 463/37 |
| 6,771,251 | B2 * | 8/2004 | Komata | 345/156 |
| 7,154,484 | B2 * | 12/2006 | Komata | 345/173 |
| 2001/0008396 | A1 * | 7/2001 | Komata | 345/156 |
| 2001/0008397 | A1 * | 7/2001 | Komata | 345/156 |
| 2001/0008403 | A1 * | 7/2001 | Komata | 345/636 |
| 2001/0008841 | A1 * | 7/2001 | Komata | 463/6 |
| 2001/0008851 | A1 * | 7/2001 | Komata | 463/37 |
| 2001/0012801 | A1 * | 8/2001 | Komata | 463/37 |
| 2004/0095313 | A1 * | 5/2004 | Komata | 345/156 |

FOREIGN PATENT DOCUMENTS

| EP | 0 922 431 A1 | 6/1999 |
|---|---|---|
| EP | 0922431 A1 * | 6/1999 |
| FR | 2 549 954 | 2/1985 |
| GB | 2 197 957 A | 6/1988 |

* cited by examiner

*Primary Examiner*—Prabodh M Dharia
(74) *Attorney, Agent, or Firm*—Katten Muchin Rosenman LLP

(57) ABSTRACT

In order to minimize differences in a pushing speed of a user pushing control elements of a controller in, for example, an entertaining system, arising from differences in the body weights of users, the gives instructions to a computer running software depending on the pushing pressure of the user on the control element connected to a pressure-sensitive device of the controller. The controller is set up to instruct the user to push the control element with at least a maximum strength. The value obtained when the control element is pushed, is stored as the maximum value. Based on the maximum value and a pressure-sensing value table defined in software or various pressure-sensing values, a new pressure-sensing value table or various new pressure-sensing values are generated.

38 Claims, 19 Drawing Sheets

| U | G |
|---|---|
| 0 | 0~15 |
| 1 | 16~25 |
| 2 | 26~35 |
| ---- | ---- |
| 23 | 236~245 |
| 24 | 246~255 |

FIG. 5

COMPUTER SYSTEM HAVING A PRESSURE-SENSITIVE CONTROLLER, SETUP METHOD FOR A PRESSURE-SENSITIVE CONTROLLER AND RECORDING MEDIUM THAT RECORDS THIS METHOD

FIELD OF THE INVENTION

The present invention relates to a novel setup method for a pressure-sensitive controller from which output (pressure-sensing values) corrected for differences in the body weights of users is obtained. It also relates to a recording medium that records a software program containing a setup program for such a controller, along with a computer system that has a pressure-sensitive controller.

BACKGROUND OF THE INVENTION

Computers include those that are used as entertainment systems represented primarily by game machines. In such an entertainment system, the operator (user) uses control elements provided upon a controller to control the start, progress and end of a game. Conventionally, "ON/OFF" type switches have been used for the control elements of a controller.

However, in recent years, for example, a pressure-sensitive type controller was disclosed in the publication of examined Japanese utility model application No. JP-B-H1-40545, wherein pressure-sensitive output is provided as input to a VCO (variable control oscillator) and the output of the VCO is used for repeated fire in a game.

A pressure-sensitive controller is a unit wherein, when pressure is applied with a finger directly to a control element connected to a pressure-sensitive device, the pushing pressure is provided as output as a pressure-sensing value. Thus, differences in body weights and differences in reflexes such as between children and adults, young people and elderly people, men and women and the like are reflected as is in the output of the controller.

(1) Differences in Maximum Pushing Pressure, Etc.

The pressure-sensing value when the greatest pressure is applied is different depending on the difference in weights among users. Moreover, the pressure-sensing value when the least pressure is applied may also be different.

(2) Difference in the Rate of Change of the Pushing Pressure

The rate of increase or rate of decrease in pushing pressure per unit of time is different depending on how good the reflexes of the user are.

If the raw pressure-sensing values entered by the user from the pressure-sensitive controller are used unmodified as input, these differences in the maximum pushing pressure and the like, and differences in the rate of change of the pushing pressure may become a problem in these games or various types of software, and have the possibility of reducing the enjoyment of the game.

SUMMARY OF THE INVENTION

It is an object of the present invention to solve the above problems arising from differences in the weights of users or how good their reflexes are.

This and other objects of the present invention are attained by a setup method for a controller that gives instructions to a computer running software depending on the pushing pressure on a control element connected to a pressure-sensitive device, wherein the setup method comprises: an instruction step wherein the user is instructed to push said control element with at least a maximum strength, a storage step wherein the value obtained when said control element is pushed is stored as the maximum value, and a correction step wherein, based on said maximum value and a pressure-sensing value table defined in software or various pressure-sensing values, a new pressure-sensing value table or various new pressure-sensing values are generated.

A recording medium according to the present invention is a recording medium on which is recorded a computer-readable and executable software program containing a setup program for a controller that gives instructions to a computer running software depending on the pushing pressure of a user on a control element connected to a pressure-sensitive device, wherein the setup program comprises: an instruction step wherein the user is instructed to push the control element with at least a maximum strength, a storage step wherein the value obtained when the control element is pushed is stored as the maximum value, and a correction step wherein, based on said maximum value and a pressure-sensing value table defined in software or various pressure-sensing values, a new pressure-sensing value table or various new pressure-sensing values are generated.

A computer system according to the present invention comprises a pressure-sensitive controller that gives instructions to a computer processor running software depending on the pushing pressure of a user on a control element connected to a pressure-sensitive device; instruction means whereby the user is instructed to push the control element with at least a maximum strength, storage means the value obtained when the control element is pushed is stored as the maximum value, and correction means whereby, based on said maximum value and a pressure-sensing value table defined in software or various pressure-sensing values, a new pressure-sensing value table or various new pressure-sensing values are generated.

In an embodiment the computer system according to the present invention comprises a controller that gives instructions to running software depending on the pushing pressure of a user on a control element connected to a pressure-sensitive device; means of measuring a maximum user pressure-sensing value which is the maximum pushing pressure of a user, means of acquiring a maximum game pressure-sensing value set by means of the software, and correction means whereby the maximum user pressure-sensing value is made to correspond to said maximum game pressure-sensing value, and the intermediate values until the maximum user pressure-sensing value is reached are calculated proportionally corresponding to the game pressure-sensing values, wherein the user pressure-sensing value which is the pushing pressure of the user on the control element is corrected by the correction means and used in said software.

In an embodiment the computer system according to the present invention comprises controller that gives instructions to running software depending on the pushing pressure of a user on a control element connected to a pressure-sensitive device; means of measuring user pressure-sensing values which are the pushing pressure of a user, means of acquiring game pressure-sensing values set by the software, and correction means whereby the user pressure-sensing values are corrected to game pressure-sensing values based on a stipulated function; wherein the user pressure-sensing value which is the pushing pressure of the user on the control element is corrected by the correction means and used in the software.

The computer system according to the present invention may comprise a controller that gives instructions to running software depending on the pushing pressure of a user on a control element connected to a pressure-sensitive device; means of measuring a maximum user pressure-sensing value rate of change which is the most rapid pushing pressure of a user, means of acquiring a maximum game pressure-sensing value rate of change set by means of the software, and correction means whereby the maximum user pressure-sensing value rate of change is made to correspond to said maximum game pressure-sensing value rate of change, and the intermediate values until the maximum user pressure-sensing value rate of change is reached are calculated proportionally corresponding to the game pressure-sensing value rate of change; wherein the user pressure-sensing value rate of change which is the pushing speed of the user on the control element is corrected by the correction means and used in the software.

A setup method according to the present invention provided for a controller that gives instructions to a computer running software depending on the pushing pressure of a user on a control element connected to a pressure-sensitive device, comprises the steps of: measuring a maximum user pressure-sensing value which is the maximum pushing pressure of a user, acquiring a maximum game pressure-sensing value set by means of the software, and performing correction whereby the maximum user pressure-sensing value is made to correspond to the maximum game pressure-sensing value, and the intermediate values until the maximum user pressure-sensing value is reached are calculated proportionally corresponding to the game pressure-sensing values; wherein the user pressure-sensing value which is the pushing pressure of the user on the control element is corrected by the correction step and used in the software.

Moreover, the setup method according to the present invention provided for a controller that gives instructions to a computer running software depending on the pushing pressure on a control element connected to a pressure-sensitive device, comprises the steps of: measuring a user pressure-sensing value which is the pushing pressure of a user, acquiring a game pressure-sensing value set by means of the software, and performing correction whereby the user pressure-sensing value is corrected to said game pressure-sensing value; wherein the user pressure-sensing value which is the pushing pressure of the user on the control element is corrected by the correction step and used in the software.

Moreover, the setup method according to the present invention provided for a controller that gives instructions to a computer running software depending on the pushing pressure on a control element connected to a pressure-sensitive device, may comprise the steps of: measuring a maximum user pressure-sensing value rate of change which is the most rapid pushing pressure of a user, acquiring a maximum game pressure-sensing value rate of change set by means of the software, and performing correction whereby the maximum user pressure-sensing value rate of change is made to correspond to the maximum game pressure-sensing value rate of change, and the intermediate values until the maximum user pressure-sensing value rate of change is reached are calculated proportionally corresponding to the game pressure-sensing value rate of change; wherein the user pressure-sensing value rate of change which is the pushing speed of the user on the control element is corrected by the correction step and used in the software.

A recording medium according is provided, on which is recorded a computer-readable and executable software program containing a setup program for a controller that gives instructions to a computer running software depending on the pushing pressure on a control element connected to a pressure-sensitive device, the setup program comprising the steps of: measuring a maximum user pressure-sensing value which is the maximum pushing pressure of a user, acquiring a maximum game pressure-sensing value set by means of said software, and performing correction whereby the maximum user pressure-sensing value is made to correspond to the maximum game pressure-sensing value, and the intermediate values until the maximum user pressure-sensing value is reached are calculated proportionally corresponding to the game pressure-sensing values.

The recording medium according to the present invention, on which is recorded a computer-readable and executable software program containing a setup program for a controller that gives instructions to a computer running software depending on the pushing pressure on a control element connected to a pressure-sensitive device, the setup program comprising the steps of: measuring user pressure-sensing values which are the pushing pressure of a user, acquiring game pressure-sensing values set by means of the software, and performing correction whereby the user pressure-sensing values are corrected to game pressure-sensing values based on a stipulated function.

In an embodiment the recording medium according to the present invention, on which is recorded a computer-readable and executable software program containing a setup program for a controller that gives instructions to a computer running software depending on the pushing pressure on a control element connected to a pressure-sensitive device, the setup program comprising the steps of: measuring a maximum user pressure-sensing value rate of change which is the most rapid pushing pressure of a user, acquiring a maximum game pressure-sensing value rate of change set by means of the software, and performing correction whereby said maximum user pressure-sensing value rate of change is made to correspond to the maximum game pressure-sensing value rate of change, and the intermediate values until the maximum user pressure-sensing value rate of change is reached are calculated proportionally corresponding to the game pressure-sensing value rate of change.

BRIEF DESCRIPTION OF THE DRAWINGS

FIG. 5 is a diagram showing an embodiment of a correction table;

DETAILED DESCRIPTION OF THE PREFERRED EMBODIMENT

As described above, in a controller that uses a pressure-sensitive device, when the button is pushed by a user, values that depend on the pushing pressure (hereinafter referred to as "user pressure-sensing values") are provided as an output. On the other hand, in software or games that use pressure-sensitive output, the pressure-sensing values required to activate various processes or actions (hereinafter referred to as "game pressure-sensing values") are expected to be predetermined. Unless some sort of manipulation is done between the user pressure-sensing values and the game pressure-sensing values, there is a possibility that differences in user's body weights and differences in reflexes may give a stronger person an advantage over a weaker person, for example, or make it more or less easy to use.

It is to be noted that throughout the specification, the drawings and the claims, the term "game pressure-sensing value" is not limited to pressure-sensing values set in game software, but also has the meaning of a pressure-sensing value set in various types of software. The term "game pressure-sensing value" is used because game software is a typical example of such software.

Thus, in the preferred embodiment, the user pressure-sensing values are corrected by the following three methods to obtain game pressure-sensing values, thus solving the problems arising from differences in the weights of users or how good their reflexes are.

(a) Correction of the Maximum User Pressure-Sensing Value, Etc.

Figure 1A:
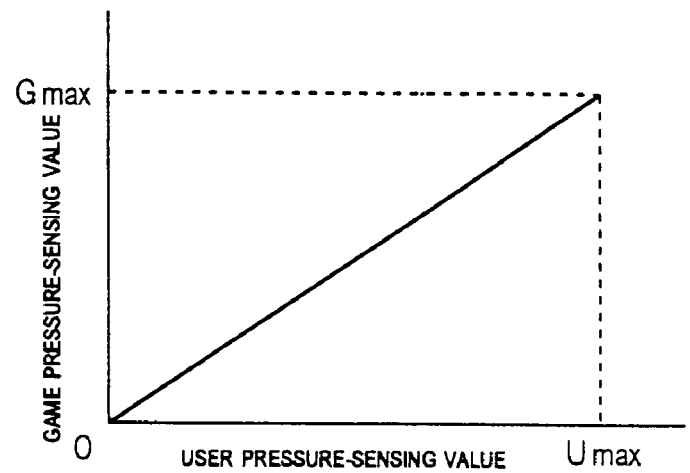
FIGS. 1A, 1B and 1C show graphs to explain the situation of correction of user pressure-sensing values into game pressure-sensing values.

As shown in the graph of FIG. 1A, the maximum value that can be achieved by the user (the maximum user pressure-sensing value $U_{max}$) is measured for each individual user, and correction is performed such that this maximum user pressure-sensing value $U_{max}$ corresponds to the maximum setting set in advance for the game or other type of software, etc. (the maximum game pressure-sensing value $G_{max}$). The intermediate values up until reaching the maximum value are calculated proportionally. Namely, a first-order linear approximation is performed. At this time, since the game pressure-sensing value is a digital value, rounding or truncation of decimal values is performed at the time of calculation of the game pressure-sensing value, thus obtaining integers.

In this manner, a so-called correction table for correcting user pressure-sensing values to game pressure-sensing values is generated. This correction table is used at the time of execution of games or various other kinds of software. By using game pressure-sensing values corresponding to user pressure-sensing values as the corrected user pressure-sensing values, an attempt is made to avoid problems due to the difference in body weights among individual users.

If desired, in addition to correction of the maximum user pressure-sensing values, it is also possible to measure the minimum value that can be achieved by the user (the minimum user pressure-sensing value $U_{min}$) for each individual user, and perform correction such that this minimum user pressure-sensing value $U_{min}$ corresponds to the minimum setting set in advance for the game or other type of software, etc. (the minimum game pressure-sensing value $G_{min}$).

This correction of the maximum user pressure-sensing value, etc. is a correction of the magnitude of the pushing pressure when the user operates the controller.

(b) Correction of Intermediate Values

In the correction of the maximum user pressure-sensing value, etc. in (a) above, the maximum user pressure-sensing value $U_{max}$ is made to correspond to the maximum game pressure-sensing value $G_{max}$ and the intermediate values are found by first-order linear approximation. However, depending on the content of the game, a first-order linear approximation may not be appropriate. For example, when putting out various moves in a fighting game, irrespective of the transition of the user pressure-sensing value over time, the quickest and most intense actions are required at the start. Alternately, in a fishing game, a continuous action that becomes gradually stronger is required to lift the fishing rod. Alternately, the swing in a golf game requires a series of actions consisting of a relatively sharp start of the swing and a subsequent follow-through with lessened power.

Figure 1B:
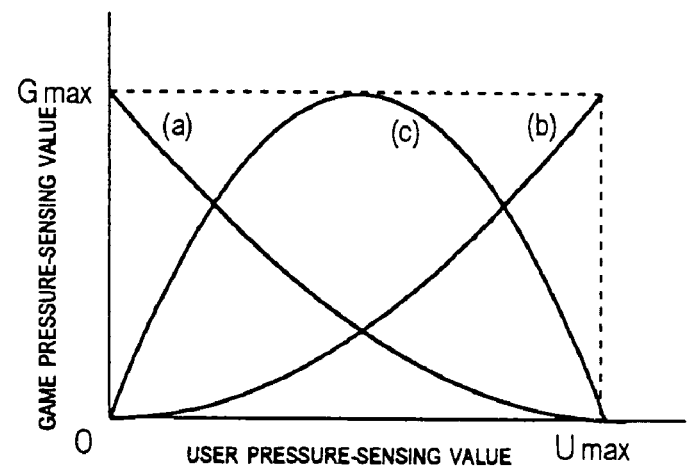

As shown in the graph of FIG. 1B, a characteristic function such as that of curve (a) where the start is most intense might be suited to a fighting game, while a characteristic function such as that of curve (b) which becomes gradually stronger might be suited to a fishing game, and a characteristic function such as that of curve (c) which gradually becomes relatively stronger until the middle of the action and then gradually becomes weaker in the latter half might be suited to a golf game.

In this manner, it is possible to make the user pressure-sensing value U correspond to the game pressure-sensing value G based upon the desired function. The function used in this game pressure-sensing value G=f(user pressure-sensing value U) may be any known function in the field of mathematics. A first-order function is used in the correction of the maximum user pressure-sensing value, etc. in (a) above. The desired function can be selected from among second-order or higher-order functions, logarithmic functions, trigonometric functions or other known functions depending on the type of game, characteristics of the actions to be performed with the controller or the like.

As shown in the graph of FIG. 1B, the user pressure-sensing value U is measured and corrected to the game pressure-sensing value G (G=f(U)) calculated from this user pressure-sensing value U. At this time, since the game pressure-sensing value G is a digital value, rounding or truncation of decimal values is performed at the time of calculation of the game pressure-sensing value, thus obtaining integers.

Note that the raw user pressure-sensing value may be used as the user pressure-sensing value, or the corrected user pressure-sensing value explained in the correction of the maximum user pressure-sensing value, etc. in (a) above may also be used.

In this manner, a correction table based on the desired function is generated. This correction table is used at the time of execution of games or various other kinds of software. To with, by using user pressure-sensing values corrected based on the desired function as the game pressure-sensing values, it is possible to obtain pressure-sensing values that are suited to the individual type of game or the characteristics of the operations performed by the controller or the like.

This correction of intermediate values is a correction to the transition over time of the pushing pressure at which the user operates the controller.

(c) Correction of the Rate of Change

Figure 1C:
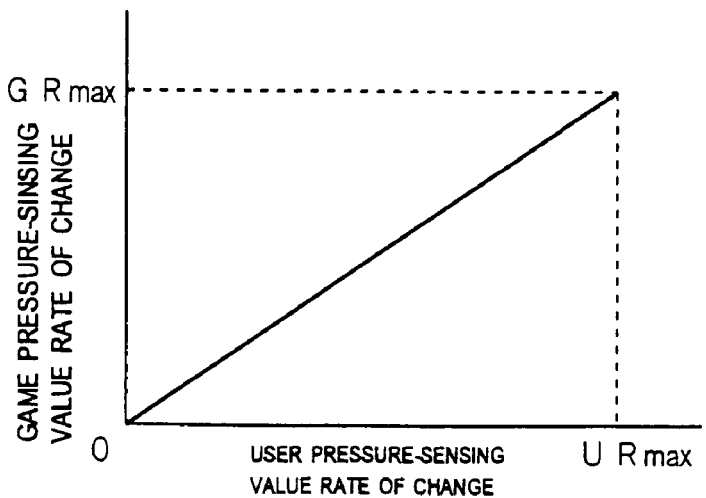

As shown in the graph of FIG. 1C, at the time of pushing the control element, the maximum rate of change value that can be achieved by the user (the maximum user pressure-sensing value rate of change $UR_{max}$) is measured for each individual user, and correction is performed such that this maximum user pressure-sensing value rate of change $UR_{max}$ corresponds to the maximum rate of change setting set in advance for the game or other type of software, etc. (the maximum game pressure-sensing value rate of change $GR_{max}$). The intermediate values are calculated proportionally. At this time, since the game pressure-sensing value is a digital value, rounding or truncation of decimal values is performed at the time of calculation of the game pressure-sensing value, thus obtaining integers.

In this manner, a so-called correction table is generated. This correction table is used at the time of execution of games or various other kinds of software. By using the corrected user pressure-sensing value rate of change as the game pressure-sensing value rate of change, it is possible to avoid problems due to the difference in reflexes among individual users.

This correction of the maximum user pressure-sensing value rate of change is a correction of the pushing speed when the user operates the controller.

Here follows a more detailed explanation of (a) the correction of the maximum user pressure-sensing value, etc., (b) the correction of intermediate values and (c) the correction of the rate of change.

(a) Correction of the Maximum User Pressure-Sensing Value, Etc.

Figure 2:
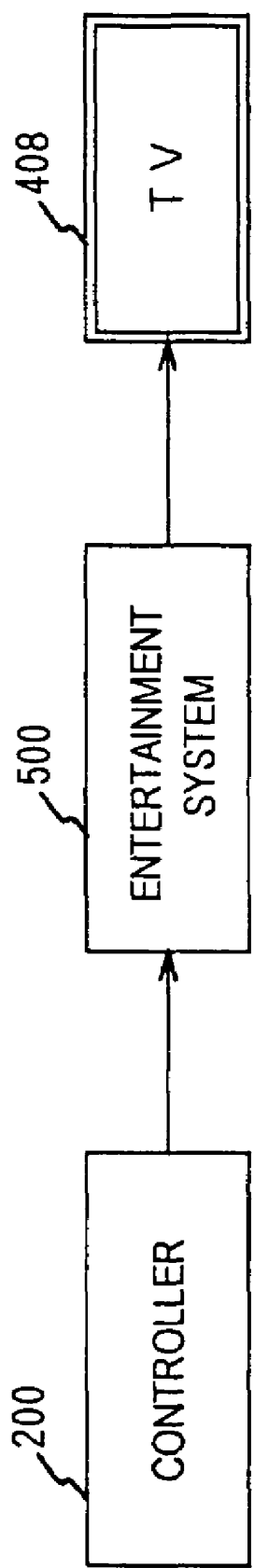
FIG. 2 is a diagram showing the connection of an entertainment system to a controller.
Figure 7:
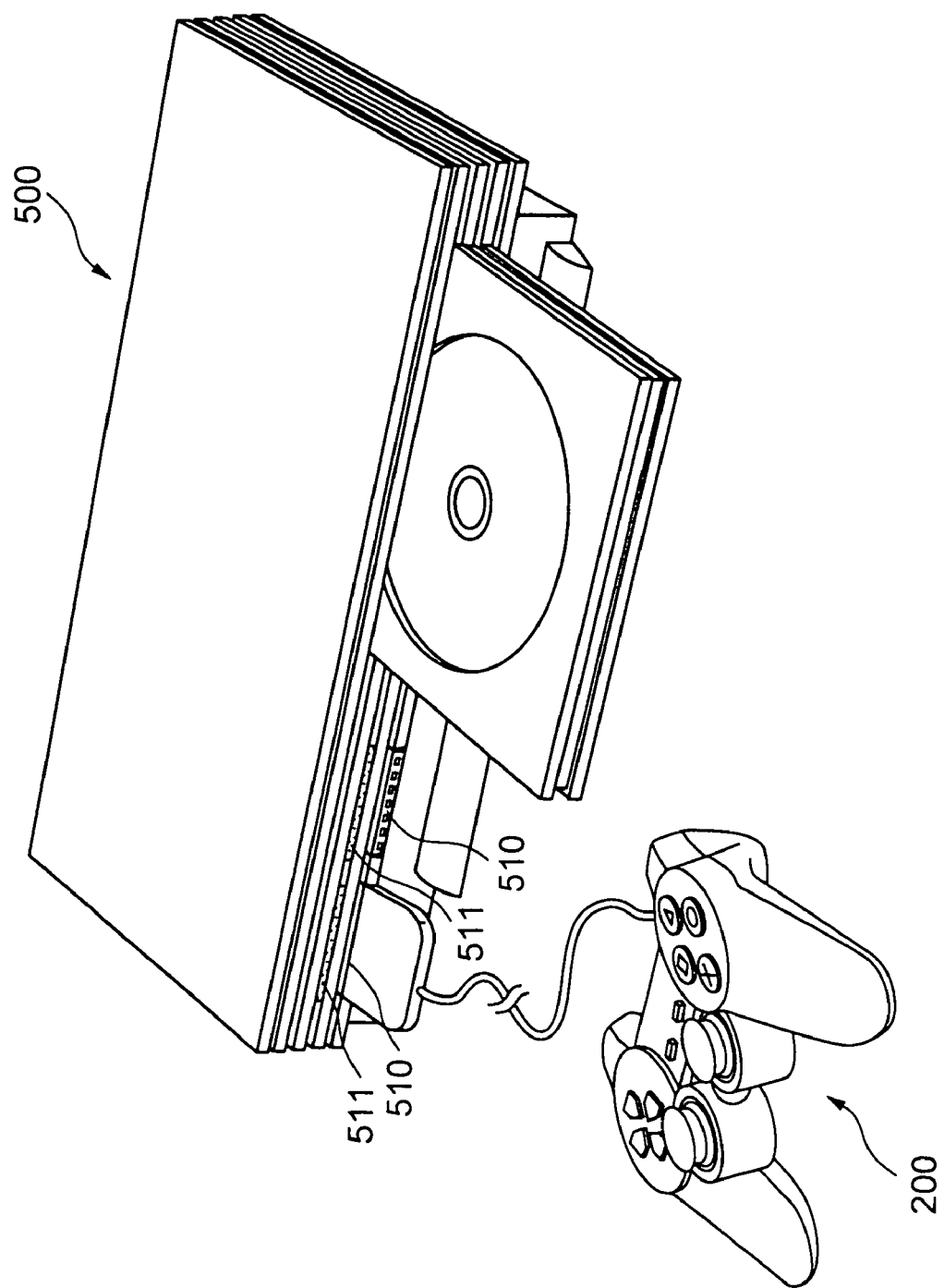
FIG. 7 is a perspective view of a controller connected to an entertainment system.

FIG. 2 shows the connection of a controller to an entertainment system to enable a user to enjoy game software or video. More specific structure is shown in FIG. 7.

As shown in FIG. 2, a controller 200 which has buttons connected to pressure-sensitive devices within the controller is connected to an entertainment system 500 used for playing games or enjoying DVD video or other types of video images, and the video output terminals are connected to a television monitor 408. Here, the analog output from the pressure-sensitive devices is converted by an A/D converter to digital values in the range 0-255 and provided to the entertainment system 500.

Figure 3:
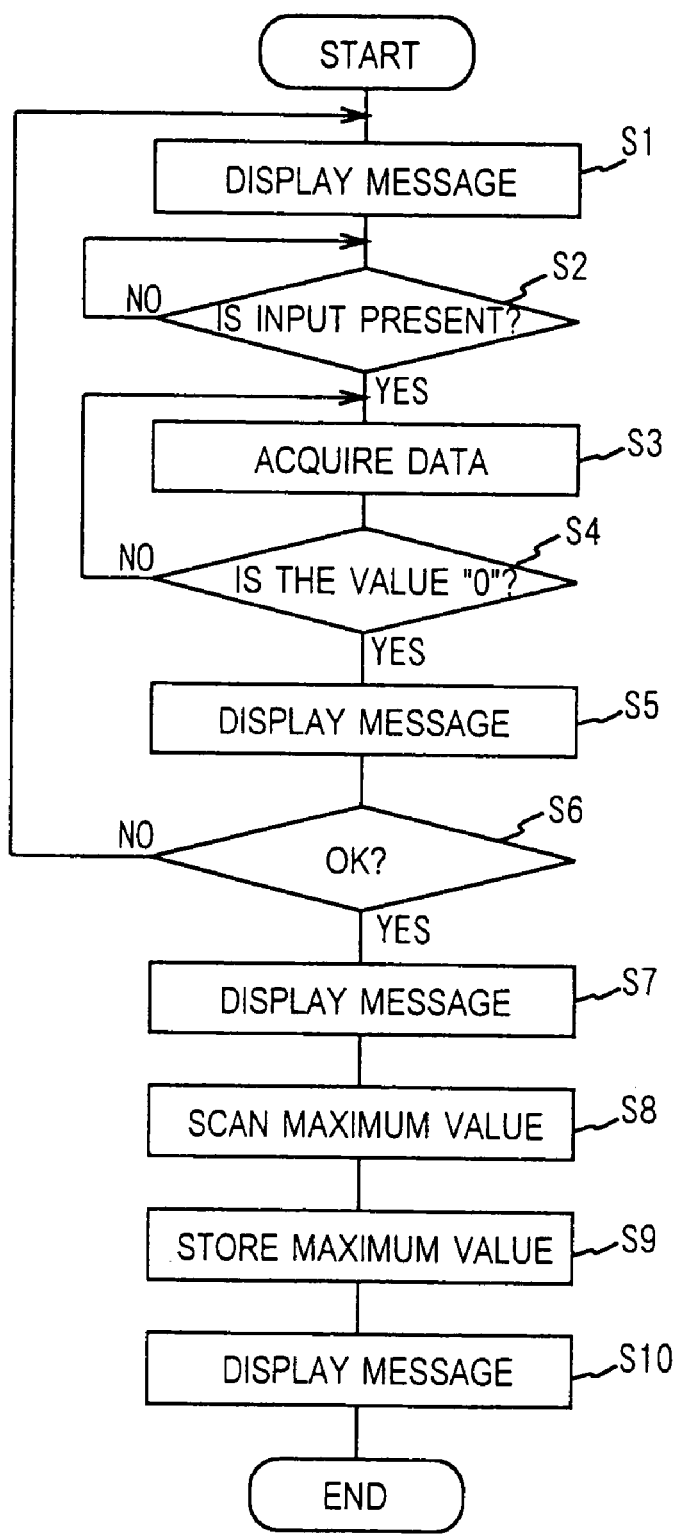
FIG. 3 is a flowchart showing a program for sampling the maximum value when a controller button or a switch is pushed by a user.

With reference to FIG. 3 on, here follows a description of how the aforementioned correction table is generated and how it is used at the time of execution of software. It is noted that the program shown in the form of a flowchart is run by the entertainment system 500 and executed by this CPU.

FIG. 3 is a flowchart showing the program for sampling the maximum value when the user pushes the buttons with the maximum force, which serves as the basis for generating the correction table for correcting the absolute value of the pressure-sensing values.

When the aforementioned program is read from media and run on the entertainment system 500, control moves to Step S1, and a message reading "This setup program sets the controller output to match your strength. Please press any button with one finger for two seconds or longer with the maximum strength you think you can manage during the game." or the like is displayed on the television monitor 408 shown in FIG. 2, prompting the user for input.

When a button of the controller 200 is pushed by the user, the pressure-sensing value generated by this pushing is provided to the entertainment system 500.

In Step S2, a decision is made as to whether or not user input is present, and if input is present, control procedure moves to Step S3 where a user pressure-sensing value is acquired.

In Step S4, a decision is made as to whether or not the user has finished pushing the button, namely a decision is made as to whether the user pressure-sensing value is "0" or not, and if not "0" then control goes back to Step S3, and if "0" then control procedure advances to Step S5 and a message reading "Your maximum value has been sampled. Is this OK?" or the like is displayed. It should be noted that in the entertainment system 500, the pressure-sensing output value from the controller 200 may be stored for one frame (1/30 second), for example.

In Step S6, when the user uses the controller 200 to select "YES" from between the choices of "YES" and "NO" displayed on the television monitor 408, control procedure advances to Step S7 and a message reading "Searching for your maximum value. Please wait." or the like is displayed. If "NO" is selected, control procedure again advances to Step S1.

In Step S8, among the stored output values (user pressure-sensing values) from the controller 200, a search for the maximum value (the maximum user pressure-sensing value) is performed, and in Step S9, the maximum user sensing value detected is stored. If desired, a search for the minimum user pressure-sensing value may also be performed and the minimum user pressure-sensing value is stored.

In Step S10, a message reading "Complete" or the like is displayed and the process is complete. It is noted that the storage means that stores the maximum value is preferably, for example, the internal memory or removable card-type external memory of the entertainment system 500.

Figure 4:
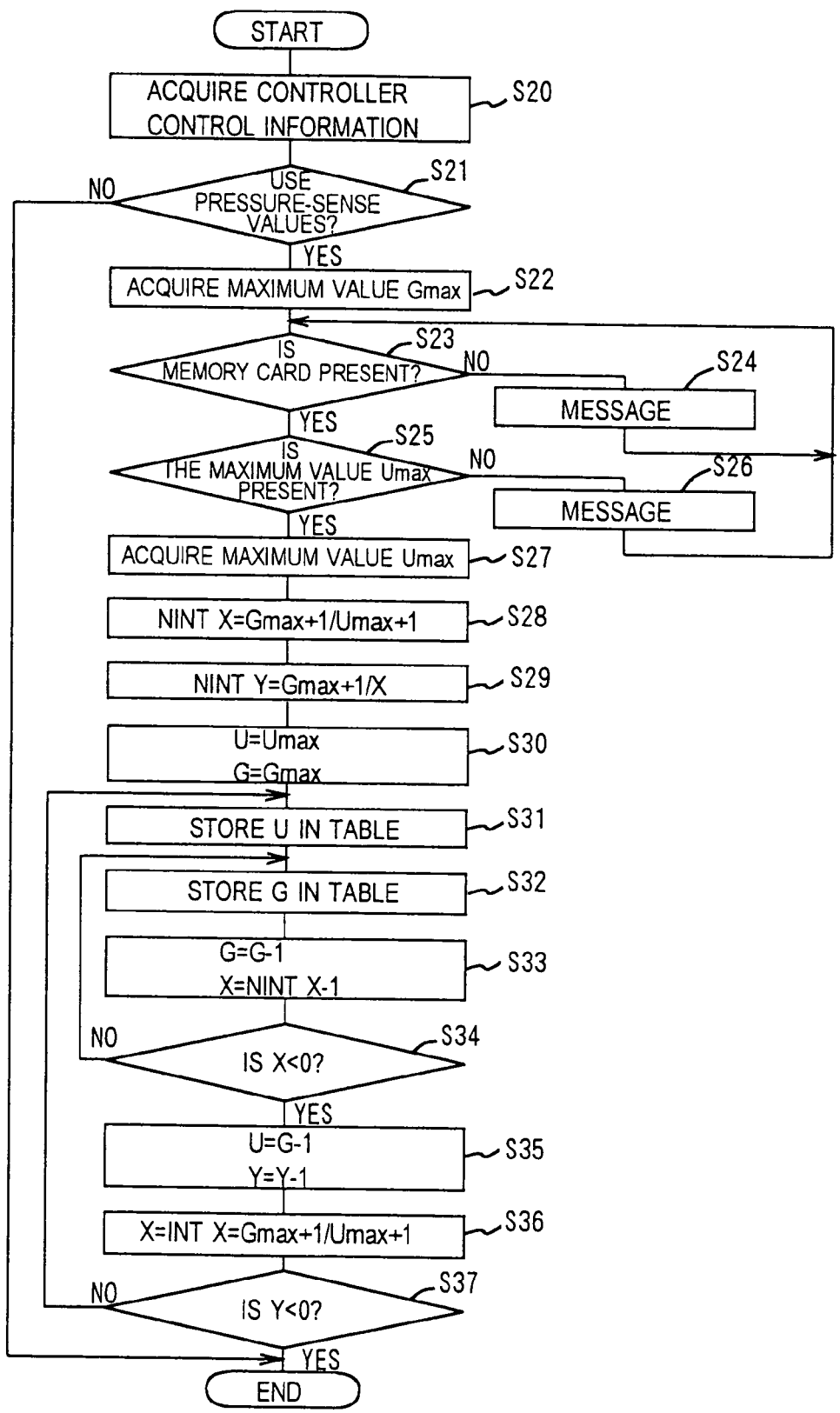
FIG. 4 is a flowchart showing a program for generating a correction table.

FIG. 4 is a flowchart showing an embodiment of a program for generating a correction table using the maximum value found in FIG. 3. Of course, any other program that is able to create a correction table may also be used. Like the program that samples the maximum value, this program is also recorded on a recording medium alone or together with the software.

In Step S20, control information regarding the controller is acquired from the software recorded upon the media loaded in the entertainment system 500. This is because depending on the software, pressure-sensing value output may not reflect the processing of software, etc. as is. For example, in the event that the role of the controller 200 is adequate as a simple ON/OFF, pressure-sensing output is unnecessary.

In Step S21, a decision is made as to whether the pressure-sensing values are to be used in an analog fashion or not, and if "YES" control procedure advances to Step S22 and if "NO" the process ends.

In Step S22, the game-side maximum value $G_{max}$ prepared in advance on the software side is acquired. In Step S23, a decision is made as to whether a memory card is present or not, and if "YES" control procedure advances to Step S25 where user input is detected by means of the procedure described in FIG. 3 and a decision is made as to whether or not the stored user-side maximum value $U_{max}$ is present, and if "NO" a message reading "Please insert a memory card." or the like is displayed in Step S24.

If the result of the decision in Step S25 is "YES" then control procedure advances to Step S27 and the user-side maximum value $U_{max}$ is acquired, and if the result of the decision is "NO" then a message reading "Please reinsert the memory card where your maximum values are stored." or the like is displayed.

In Step S28, the value software-side maximum value $G_{max}+1$ is divided by the user-side maximum value $U_{max}+1$ to find the ratio $X=(G_{max}+1)/(U_{max}+1)$ and the result is rounded to the nearest integer. The symbol NINT X represents rounding the ratio X to the nearest integer.

In Step S29, the value software-side maximum value $G_{max}+1$ is divided by the ratio X to find the software-side allocation value Y (NINT $Y=G_{max}+1/X$).

Figure 5:
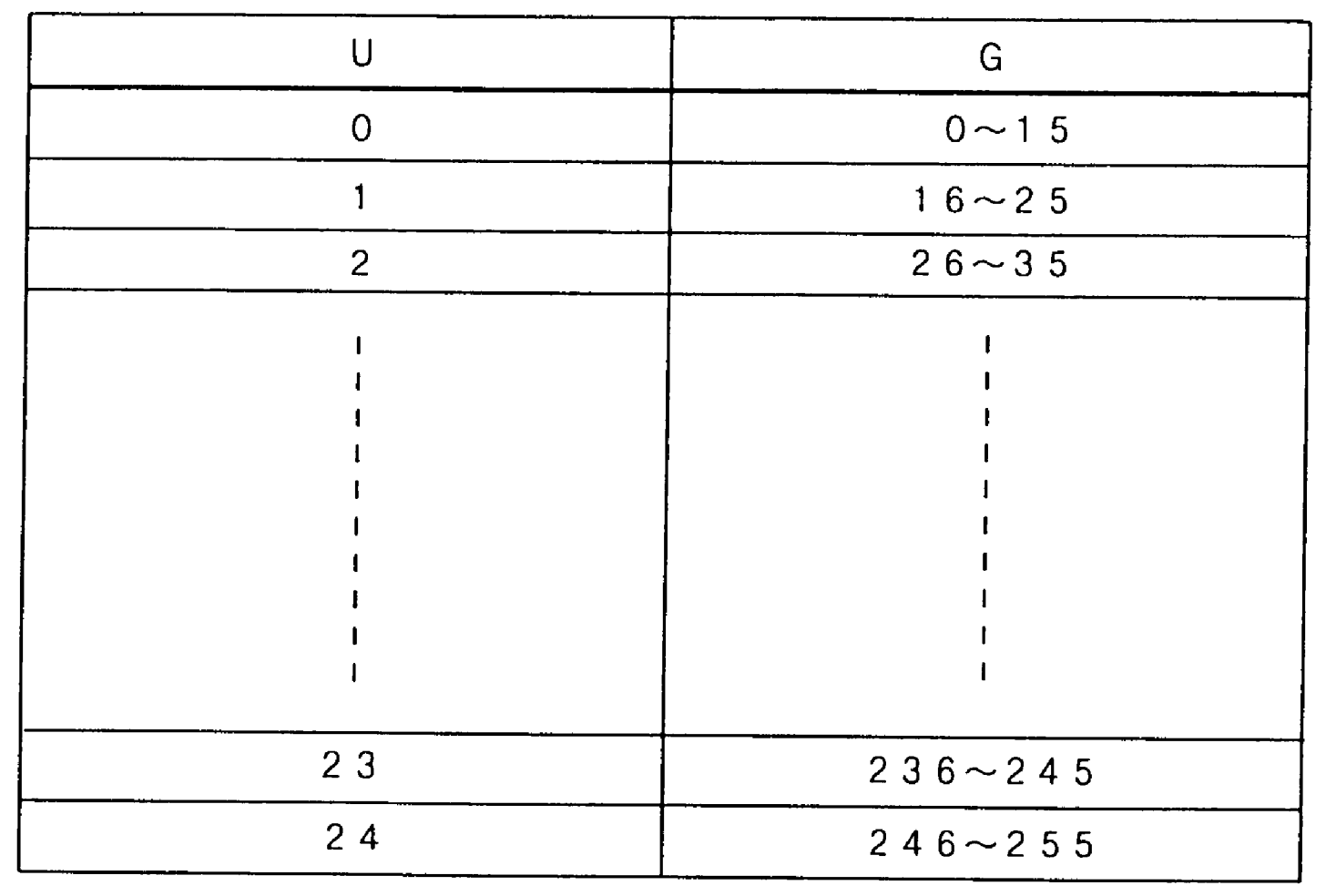

In Step S30, in the correction table shown in FIG. 5, the maximum game pressure-sensing value $G_{max}$ is allocated as the game pressure-sensing value G in the right column of the table, while the maximum user pressure-sensing value $U_{max}$ is allocated as the user pressure-sensing value U in the left column of the table.

In Step S31, the user pressure-sensing value U is written in the left column of the correction table. In the same manner, in Step S32, the game pressure-sensing value G is written in the right column of the correction table. In the first iteration, each is the maximum value.

In Step S33, G is decremented by 1. In addition, NINT X is decremented by 1. In the correction table shown in FIG. 5, there are 10 game pressure-sensing values G (=NINT X) corresponding to one user pressure-sensing value U. In Step S34, a decision is made as to whether X is negative or not. If it is positive or zero, Steps S31 through S33 are repeated. When X becomes negative, the correction column with one fewer user pressure-sensing values is created.

In Step S35, U is decremented by "1." In addition, Y is decremented by "1." In the correction table shown in FIG. 5, there are 26 user pressure-sensing values U in the column corresponding to NINT Y.

In Step S36, in the same manner as in Step S28, the substitution X=NINT X is made. In Step S37, a decision is made as to whether Y is negative or not. If it is positive or zero, Steps S31 through S36 are repeated. When Y becomes negative, processing ends.

FIG. 5 shows an example of the table generated by the above process. This example shows the case wherein the user maximum value $U_{max}$ is "24," so there are 25 steps from "24" to "0," and the software-side maximum value $G_{max}$ is "255" so there are 256 steps from "255" to "0." To with, each user pressure-sensing value U in one step is allocated to "10" steps of the game pressure-sensing value G, in the manner "246"-"255", "236"-"245", "236"-"245", ... "26"-"35", "16"-"25". Note that the minimum value "0" of the user-side allocated value is allocated to "16" steps of the software-side allocated values from "0"-"15".

When this table is used, when the user presses a button of the controller 200, if the user pressure-sensing value is "2" for example, the game pressure-sensing value will be recognized on the software side to be "26"-"35" and processing based thereupon will be performed. It is noted that on the software side, the values within the various aforementioned ranges, namely, "0"-"15", "16"-"25", "26"-"35", etc can be used freely. For example, it may use the maximum value or minimum value within each range, or use the average value within each range.

Figure 6:
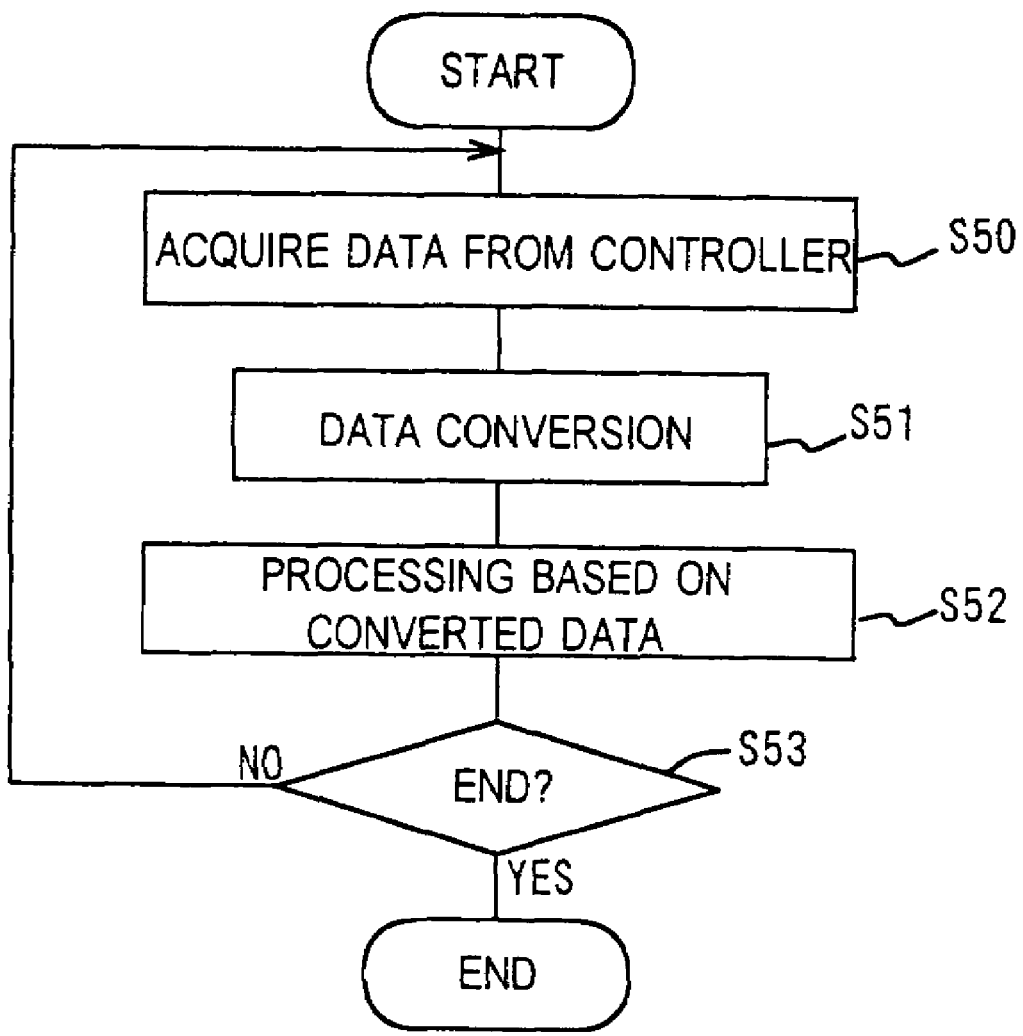
FIG. 6 is a flowchart showing state wherein a correction table is used.

FIG. 6 is a flowchart that shows the state when a correction table such as that shown in FIG. 5 is used.

In Step S50, data is acquired from the controller 200, and in Step S51, data conversion of the user pressure-sensing values to game pressure-sensing values is performed based on a correction table such as that shown in FIG. 5, and Step S52, processing is performed based on the converted data and processing ends if Step S53 comes to that decision.

It should be noted that depending on the software, according to its purpose, 256 steps of pressure-sensing values may not be defined, but only roughly two or three specific pressure-sensing values and their range of fluctuation are defined. In this case, the number of steps will be lower on the game side and higher on the user side. Accordingly, in this case, the operation for allocating a number of user pressure-sensing values to a single game pressure-sensing value G is shown in FIG. 4, where in Step S28, the operation NINT $X=U_{max}+1/G_{max}+1$ is executed, and in Step S29, the operation NINT $Y=U_{max}+1/X$ is executed, and in Steps S30 on, it is sufficient to exchange the user pressure-sensing values U and game pressure-sensing values G.

(b) Correction of Intermediate Values

The correction of intermediate values is the correction of user pressure-sensing values U to game pressure-sensing values G based on the desired function, by means of the calculation of game pressure-sensing value G=f(user pressure-sensing value U). The function used in the calculation of this game pressure-sensing value G=f(user pressure-sensing value U) may be any known function in the field of mathematics. Any one or two or more functions may be selected according to the type of a game and the characteristics of various actions, etc.

The correction table for correcting user pressure-sensing values U to game pressure-sensing values G may be calculated by hand in advance to prepare the correction table. Alternately, the correction table may be prepared by program based on an appropriate flowchart as shown in FIG. 5. Such a correction table may be provided in a stipulated storage unit utilizing a memory card or the internal ROM of the entertainment unit, or as a portion of the application software.

(c) Correction of the Rate of Change

The correction of the rate of change is performed by measuring the maximum user pressure-sensing value rate of change that can be achieved by the user $UR_{max}$ for each individual user, and correction is performed such that this maximum user pressure-sensing value rate of change $UR_{max}$ corresponds to the maximum game pressure-sensing value rate of change $GR_{max}$ set in advance for the game or other type of software, etc., and the intermediate values are calculated proportionally.

The correction table for correcting the user pressure-sensing value rate of change UR to the game pressure-sensing value rate of change GR may be calculated by hand in advance to prepare the correction table. Alternately, the correction table may be prepared by A program based on an appropriate flowchart as shown in FIG. 5, by replacing the user pressure-sensing value U with the user pressure-sensing value rate of change UR, and replacing the game pressure-sensing value G with the user pressure-sensing value rate of change UR. Such a correction table may be provided in a stipulated storage unit utilizing a memory card or the internal ROM of the entertainment unit, or as a portion of the application software.

It is to be noted that both, the case wherein all of the programs described in the preferred embodiment are recorded individually on an optical disk or other recording medium, and the case wherein they are recorded on the recording medium together with the game software program are possible. The meaning of supplying these programs recorded individually on a recording medium has the meaning of preparing them in advance as a library for software development. As is common knowledge, at the time of developing software, writing all functions requires an enormous amount of time. However, if the software functions are divided into single functions, for example, objects can be moved and otherwise used commonly by various types of software, so more functions can be included.

To this end, a function such as that described in the preferred embodiment that can be used commonly may be provided to the software manufacturer side as a library program. When general functions like this are supplied as external programs in this manner, it is sufficient for the software manufacturers to write only the essential portions of the software.

Since this preferred embodiment is constituted and functions as described above, differences in pushing pressure due to differences in the strength of users are less reflected as is in the controller output (pressure-sensing values). As a result, it is possible to prevent the problems when such pressure-sensitive controllers are used to execute games and various types of software and the like.

Moreover, changes in the pushing speed, namely the rate of change in the magnitude of the pushing force per unit time, or namely changes in the rate of increase or rate of decrease depending on differences in the strength of the user can be kept low.

Moreover, by means of this preferred embodiment, it is possible to provide a novel pressure-sensitive controller that, at the time of execution of various types of programs, gives pressure-sensing values corrected for differences in the user pressure-sensing values.

Here follows a description of an embodiment of the present invention in the case of its application to the controller of an entertainment system which is one example of a computer system.

FIG. 7 is a perspective view of the controller 200 connected to the entertainment system 500. The controller 200 is removably connected to the entertainment system 500, and the entertainment system 500 is connected to a television monitor 408 (omitted in FIG. 7).

The entertainment system 500 reads the program for a computer game from recording media upon which that program is recorded, and by executing the program, has a function for displaying characters on the television monitor 408. The entertainment system 500 also has various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like on the television monitor 408.

While this depends also on the content of the computer game program, controller 200 may be allocated functions for moving the characters displayed on the television monitor 408 in the directions up, down, left or right.

Figure 8:
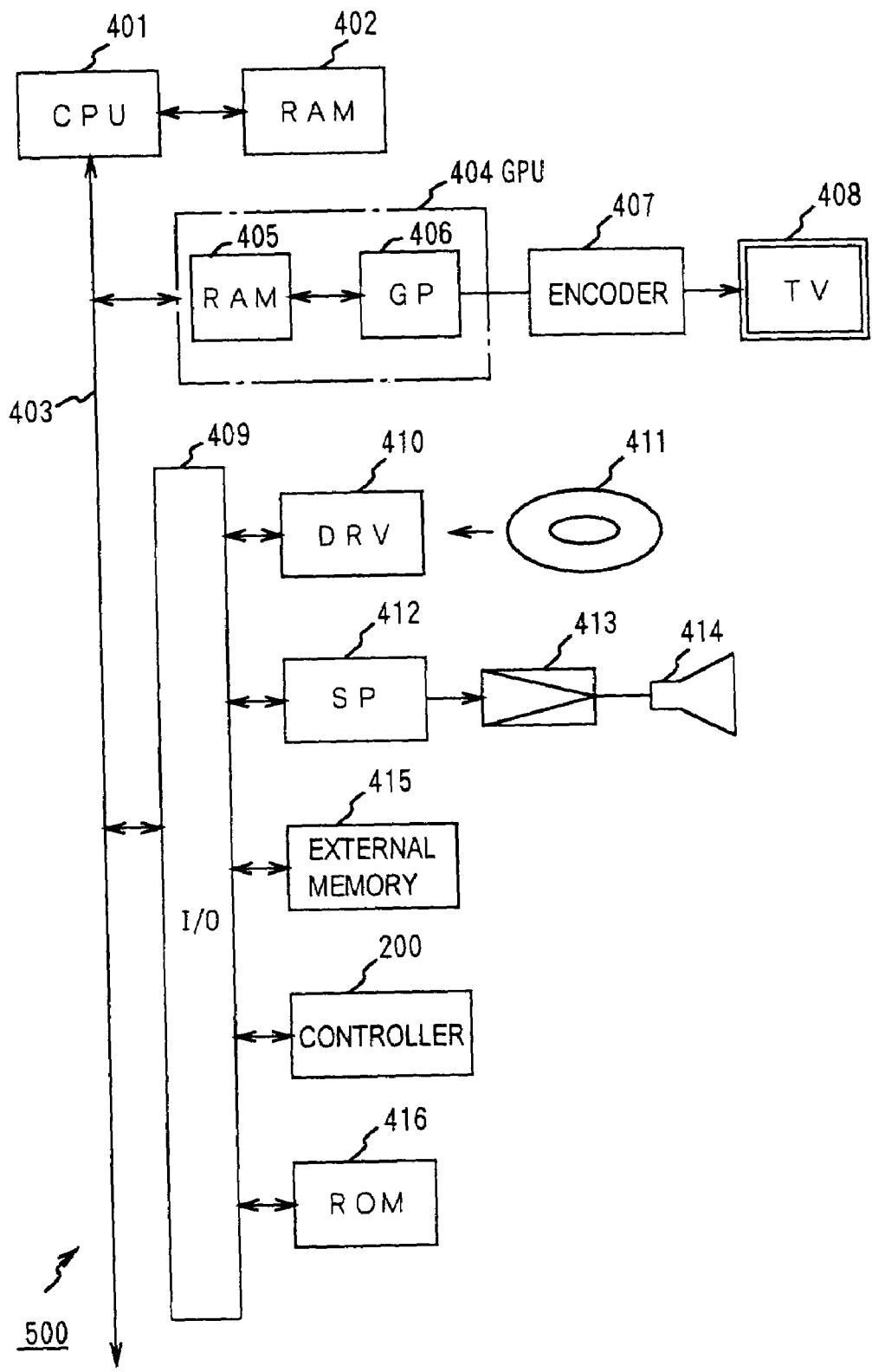
FIG. 8 is a block diagram of an entertainment system.

With reference to FIG. 8, here follows a description of the interior of the entertainment system 500 shown in FIG. 7. FIG. 8 is a block diagram of the entertainment system 500.

A CPU 401 is connected to RAM 402 and a bus 403, respectively. Connected to bus 403 are a graphics processor unit (GPU) 404 and an input/output processor (I/O) 409, respectively. The GPU 404 is connected via an encoder 407 for converting a digital RGB signal or the like into the NTSC standard television format, for example, to a television monitor (TV) 408 as a peripheral. Connected to the I/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via a connector 511 to the entertainment system 500 shown in FIG. 7. The controller 200 is constructed such that, when a plurality of buttons provided thereupon are pushed, it gives instructions to the entertainment system 500. In addition, the driver 410 is provided with a decoder for decoding images encoded based upon the MPEG standard.

The description will be made now as to how the images will be displayed upon the television monitor 408 based on the operation of the controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data, Z data and texture data, the GPU 404 performs the drawing process by writing texture data sequentially into the RAM 405. One frame of image data upon which the drawing process is completed is encoded by the encoder 407 and then supplied to the television monitor 408 and displayed on its screen as an image.

Figure 9:
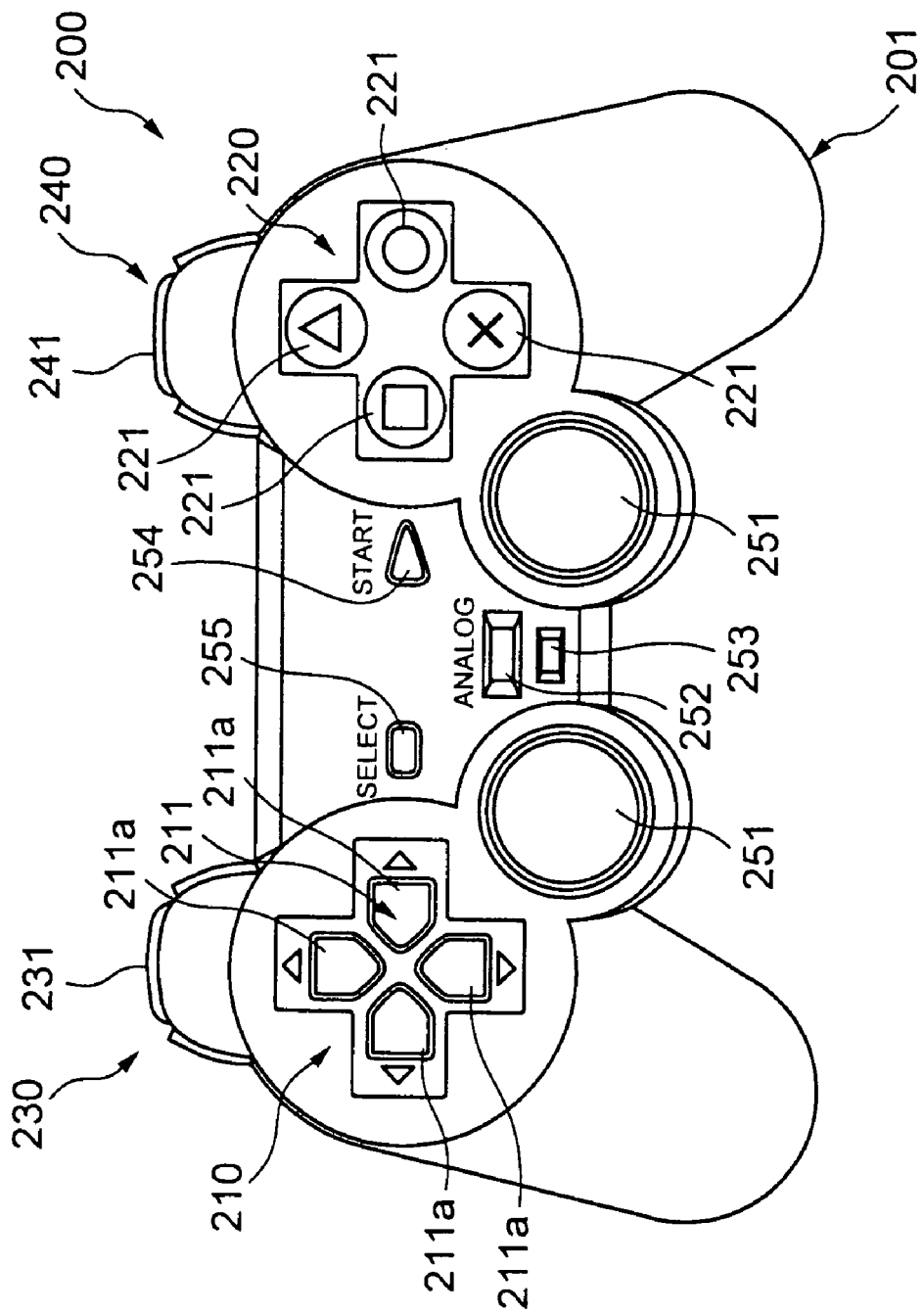
FIG. 9 is a top view of a controller.

FIG. 9 is a top view of the controller 200. The controller 200 consists of a unit body 201 on the top surface of which are provided first and second control parts 210 and 220, and on the side surface of which are provided third and fourth control parts 230 and 240 of the controller.

The first control part 210 of the controller is provided with a cruciform control unit 211 used for pushing control, and the individual control keys 211a extending in each of the four directions of this control unit 211 form a control element. The first control part 210 is the control part for providing movement to the characters displayed on the screen of the television receiver, and has functions for moving the characters in the up, down, left and right directions by pressing the individual control keys 211a of the control unit 211.

The second control part 220 is provided with four cylindrical control buttons 221 (control elements) for pushing control. The individual control buttons 221 have identifying marks such as ○, △, □, and x on their tops, in order to easily identify the individual control buttons 221. The functions of the second control part 220 are set by the game program recorded upon the optical disc 411, and the individual control buttons 221 may be allocated functions that change the state of the game characters, for example. For example, the control buttons 221 may be allocated functions for moving the left arm, right arm, left leg and right leg of the character.

The third and fourth control parts 230 and 240 of the controller 200 have nearly the same structure, and both are provided with two control buttons 231 and 241 (control elements) for pushing control, arranged above and below. The functions of these third and fourth control parts 230 and 240 are also set by the game program recorded upon the optical disc, and may be allocated functions for making the game characters do special actions, for example.

Moreover, two joy sticks 251 for performing analog operation are provided upon the unit body 201 shown in FIG. 9. The joy sticks 251 can be switched and used instead of the first and second control parts 210 and 220 described above. This switching is performed by means of an analog selection switch 252 provided upon the unit body 201. When the joy sticks 251 are selected, a display lamp 253 provided on the unit body 201 lights, indicating the state wherein the joy sticks 251 are selected.

It should be noted that on unit body 201 there are also provided a start switch 254 for starting the game and a select switch 255 for selecting the degree of difficulty or the like at the start of a game, and the like.

FIG. 10 and FIGS. 11A-11C show an embodiment of the second control part 220 of the controller.

Figure 10:
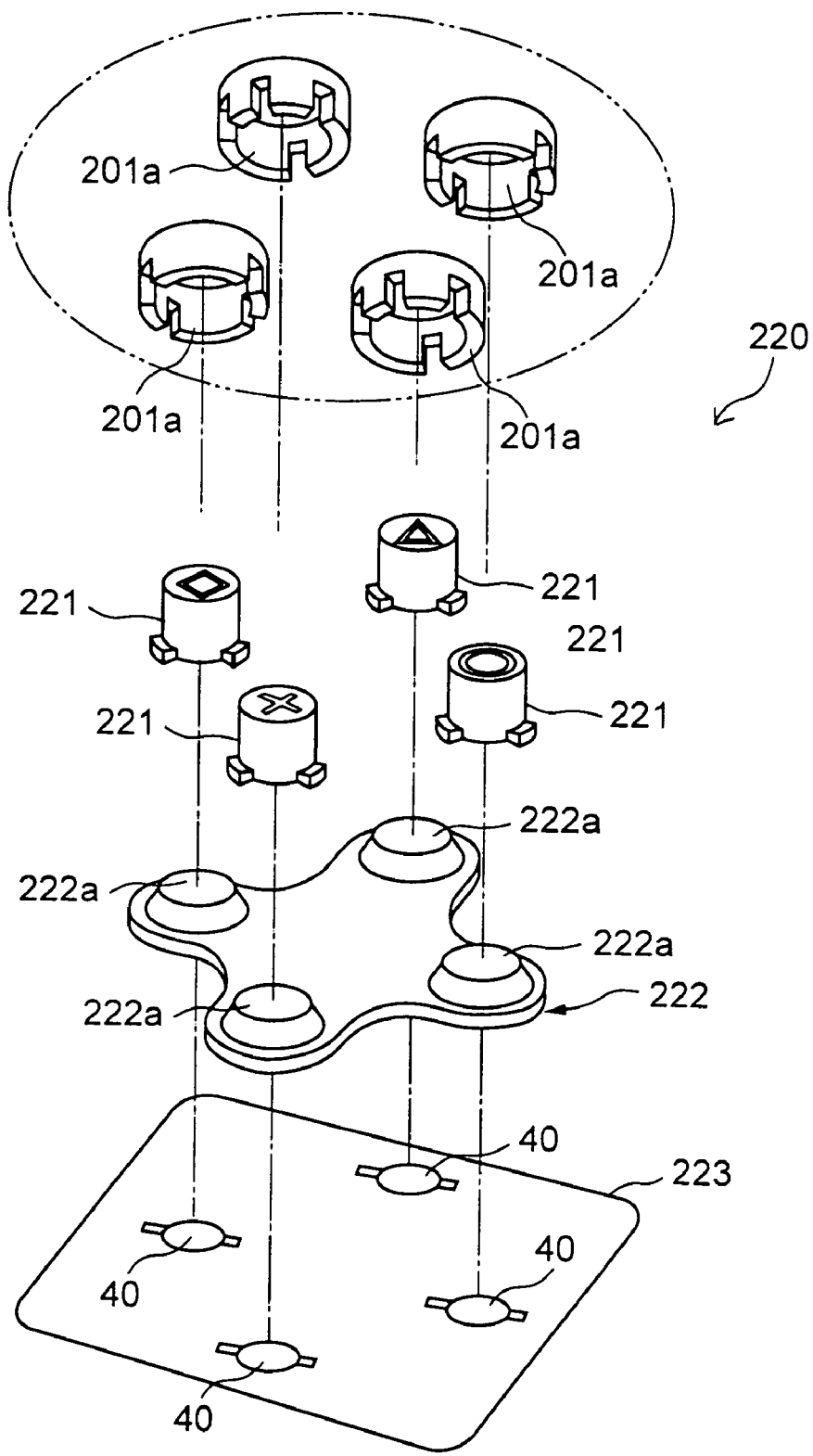
FIG. 10 is an exploded perspective view of the second control part of the controller.

As shown in FIG. 10, the second control part 220 consists of four control buttons 221 which serve as the control elements, an elastic body 222, and a sheet member 223 provided with resistors 40. The individual control buttons 221 are inserted from behind through insertion holes 201a formed on the upper surface of the unit body 201. The control buttons 221 inserted into the insertion holes 201a are able to move freely in the axial direction.

Figure 11A:
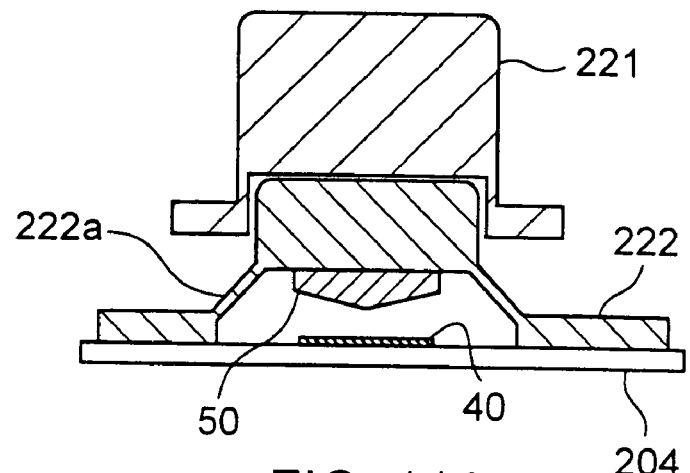
FIGS. 11A-11C are cross-sections of the second control part of the controller of FIG. 10.
Figure 11B:
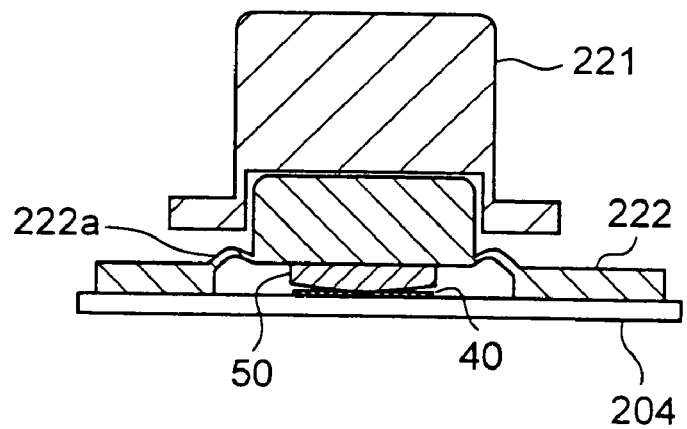
Figure 11C:
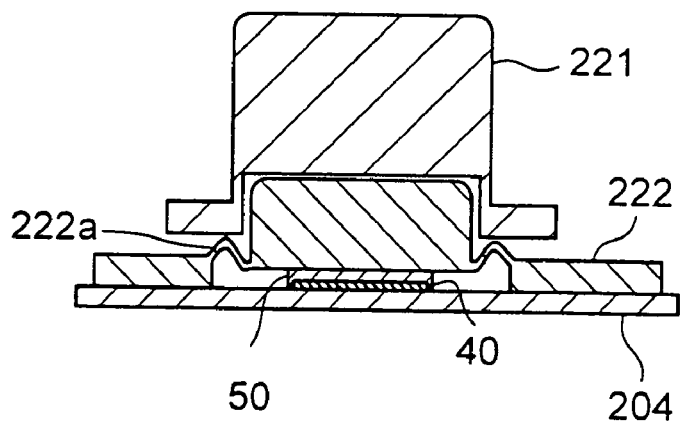

The elastic body 222 is made of insulating rubber or the like and has elastic areas 222a which protrude upward, and the lower ends of the control buttons 221 are supported upon the upper walls of the elastic areas 222a. When the control buttons 221 are pressed, the inclined-surface portions of these elastic areas 222a flex so that the upper walls move together with the control buttons 221. On the other hand, when the pushing pressure on the control buttons 221 is released, the flexed inclined-surface portions of these elastic areas 222a elastically return to their original shape, pushing up the control buttons 221. The elastic body 222 functions as a spring means whereby control buttons 221 which had been pushed in by a pushing action are returned to their original positions. As shown in FIGS. 11A-11C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received from the control buttons 221.

To describe this in more detail, as shown in FIGS. 11A-11C, the second control part 220 is provided with control buttons 221 as control elements, an elastic body 222, conducting members 50 and resistors 40. Each conducting member 50 may be made of conductive rubber which has elasticity, for example, and has a conical shape with its center as a vertex. The conducting members 50 are adhered to the inside of the top surface of the elastic areas 222a formed in the elastic body 222.

In addition, the resistors 40 may be provided on an internal board 204, for example, opposite the conducting members 50, so that the conducting members 50 come into contact with resistors 40 together with the pushing action of the control buttons 221. The conducting member 50 deforms depending on the pushing force on the control button 221 (namely the contact pressure with the resistor 40), so as shown in FIGS. 11B and 11C, the surface area in contact with the resistor 40 varies depending on the pressure. To with, when the pressing force on the control button 221 is weak, as shown in FIG. 11B, only the area near the conical tip of the conducting member 50 is in contact. As the pressing force on the control button 221 becomes stronger, the tip of the conducting member 50 deforms gradually so the surface area in contact expands.

Figure 12:
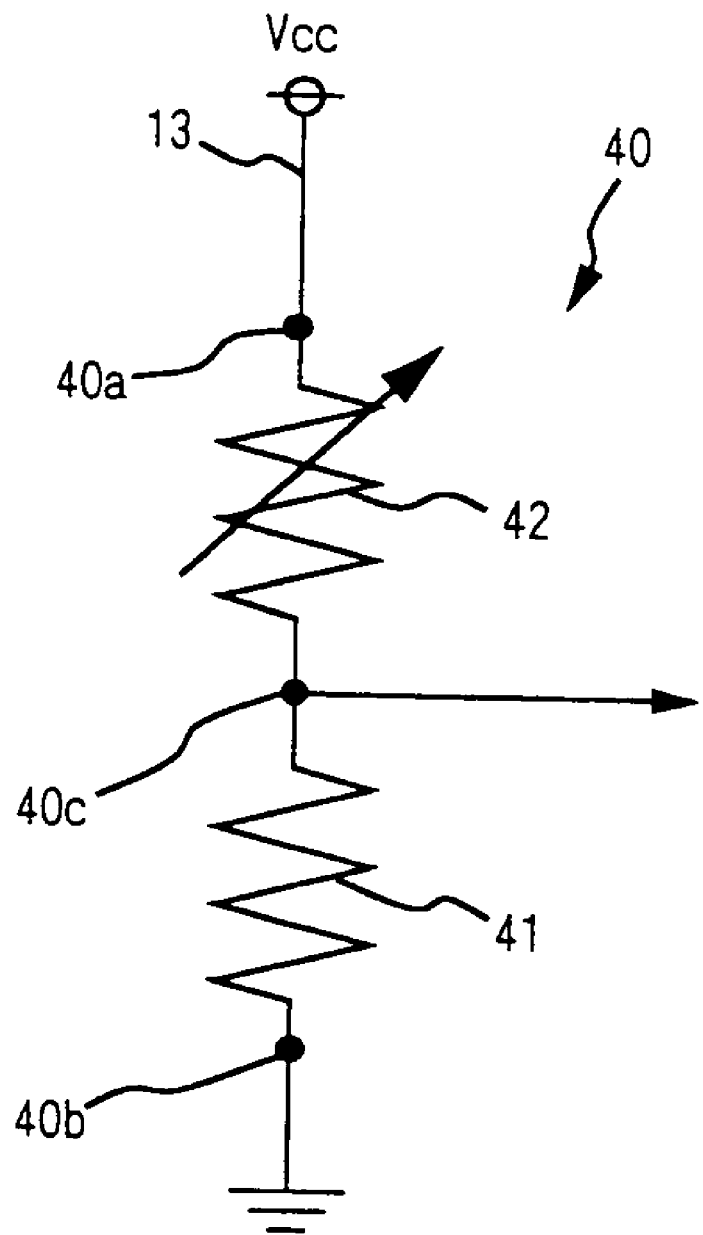
FIG. 12 is a diagram showing an equivalent circuit for a pressure-sensitive device.

FIG. 12 is a diagram showing an equivalent circuit for a pressure-sensitive device consisting of a resistor 40 and conducting member 50. As shown in this diagram, the pressure-sensitive device is inserted in series in a power supply line 13, where the voltage $V_{cc}$ is applied between the electrodes 40a and 40b. As shown in this diagram, the pressure-sensitive device is divided into a variable resistor 42 that has the relatively small resistance value of the conducting member 50, and a fixed resistor 41 that has the relatively large resistance value of the resistor 40. Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes. In this manner, the entire pressure-sensitive device can be understood to be a variable resistor. Note that FIG. 11 shows only the contact portion between the conducting member 50 and resistor 40 which forms the variable resistor 42 of FIG. 12, but the fixed resistor 41 of FIG. 12 is omitted from FIGS. 11A-11C.

In this preferred embodiment, an output terminal is provided near the boundary between variable resistor 42 and fixed resistor 41, namely near the intermediate point of the resistors 40, and thus a voltage stepped down from the applied voltage $V_{cc}$ by the amount the variable resistance is extracted as an analog signal corresponding to the pushing pressure on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$. If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output from the output terminal 40c of the resistor 40 increases. Furthermore, the analog signal (voltage) output from the output terminal 40c of the resistor 40 reaches the maximum $V_{max}$ when the conducting member 50 is most deformed.

Figure 13:
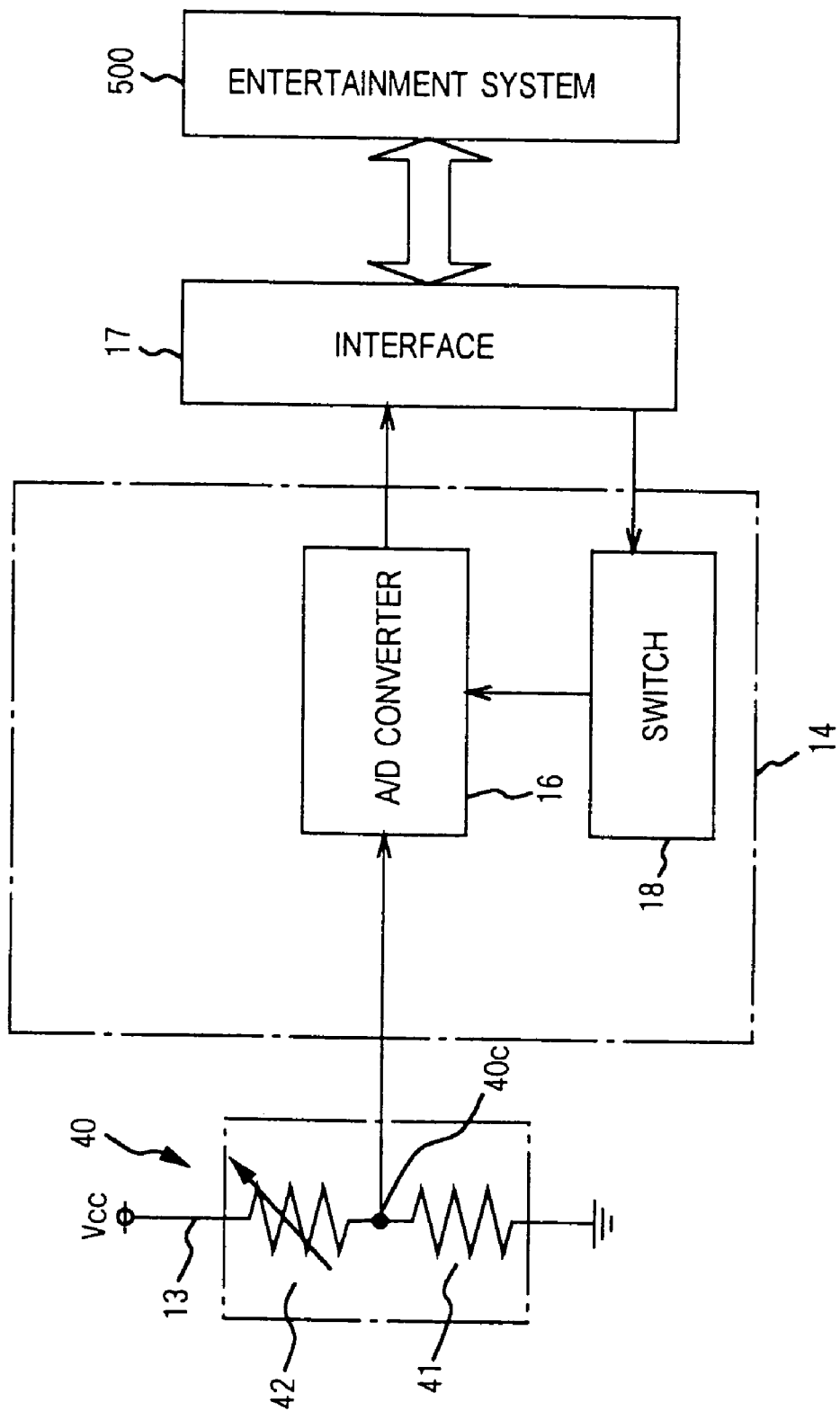
FIG. 13 is a block diagram of the main parts of the controller.

FIG. 13 is a block diagram showing the main parts of the controller 200.

An MPU 14 mounted upon the internal board of the controller 200 is provided with a switch 18 and an A/D converter 16. The analog signal (voltage) output from the output terminal 40c of the resistor 40 is provided as input to the A/D converter 16 and converted to a digital signal.

The digital signal outputted from the A/D converter 16 is sent via an interface 17 provided upon the internal board of the controller 200 to the entertainment system 500 and the actions of game characters and the like are executed based on this digital signal.

Changes in the level of the analog signal output from the output terminal 40c of the resistor 40 correspond to changes in the pushing pressure received from the control button 221 (control element) as described above. Therefore, the digital signal output from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only on zeroes and ones.

The configuration is such that the switch 18 is controlled by a control signal sent from the entertainment system 500 based on a game program recorded on an optical disc 411. To with, when a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 14:
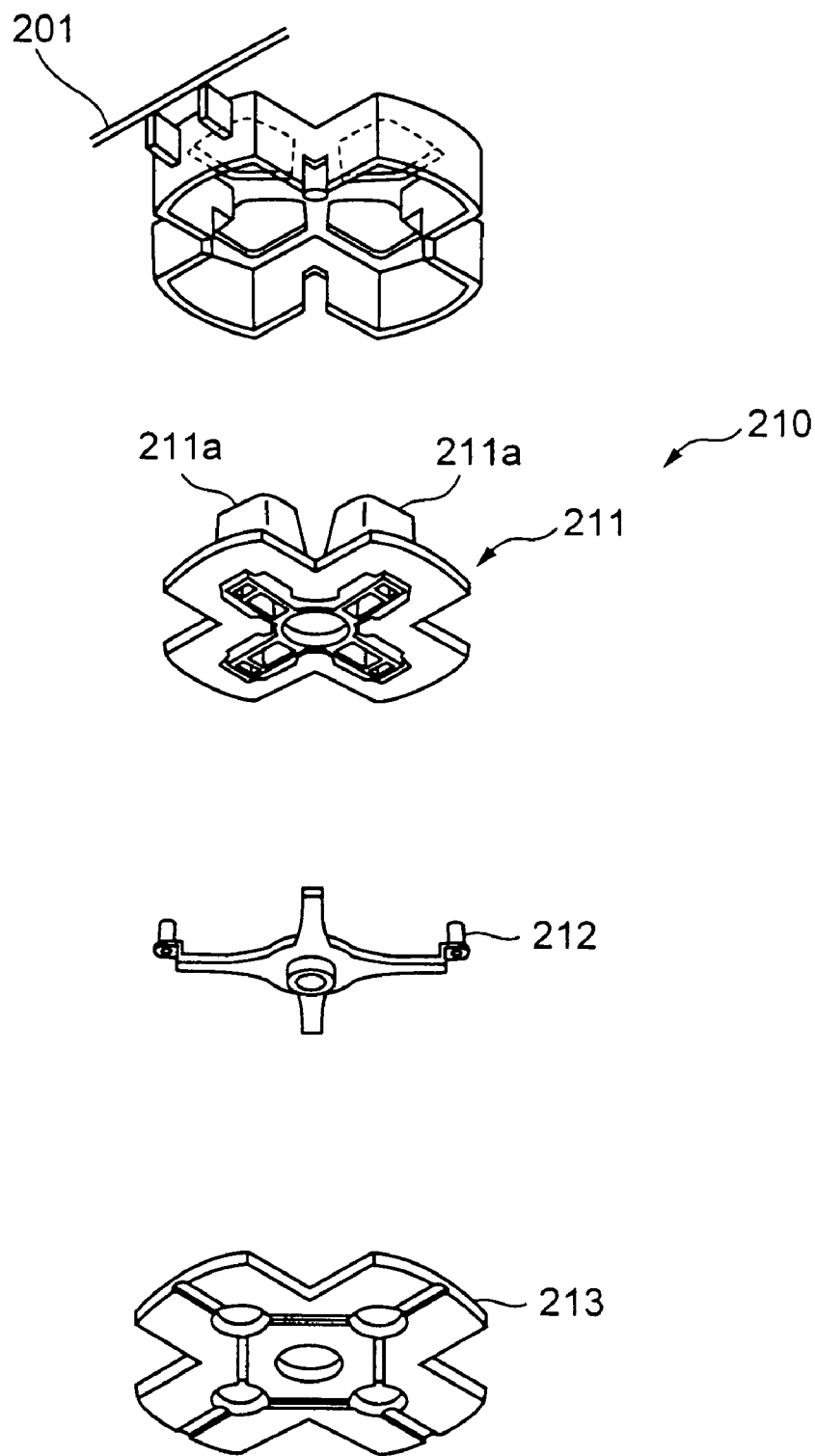
FIG. 14 is an exploded perspective view of the first control part of the controller.
Figure 15:
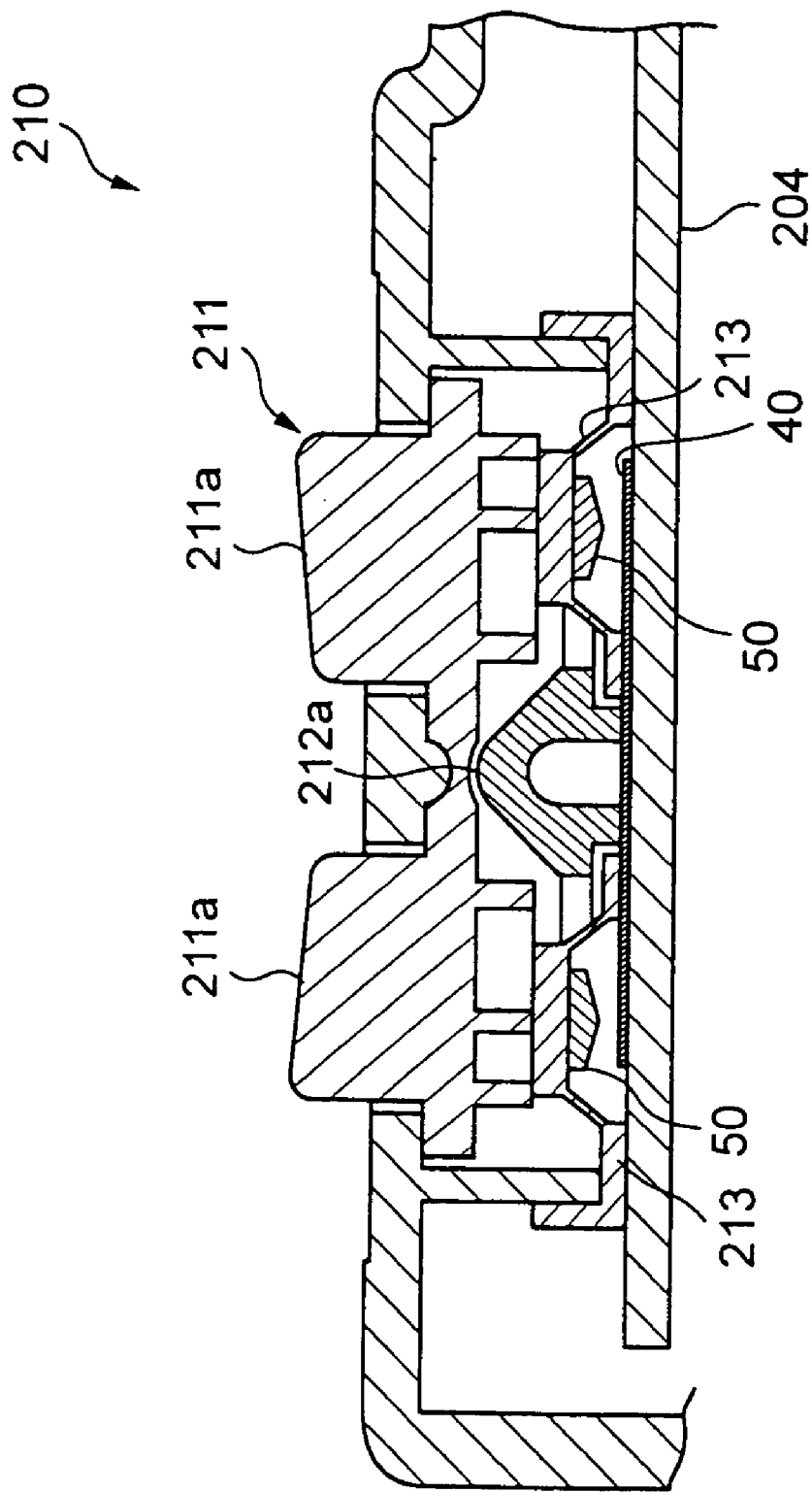
FIG. 15 is a cross section of the first control part of FIG. 14.

FIGS. 14 and 15 show an embodiment of the first control part of the controller.

As shown in FIG. 14, the first control part 210 includes a cruciform control unit 211, a spacer 212 that positions this control unit 211, and elastic body 213 that elastically supports the control unit 211. Moreover, as shown in FIG. 15, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 already has been made public knowledge in the publication of unexamined Japanese patent application No. JP-A-H8-163672. However, the control unit 211 uses a hemispherical projection 212a formed in the center of the spacer 212 as a fulcrum, and the individual control keys 211a (control elements) are assembled such that they can push upon the resistor 40 side (see FIG. 15).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so its electrical resistance value varies depending on the magnitude of the pushing pressure.

Figure 16:
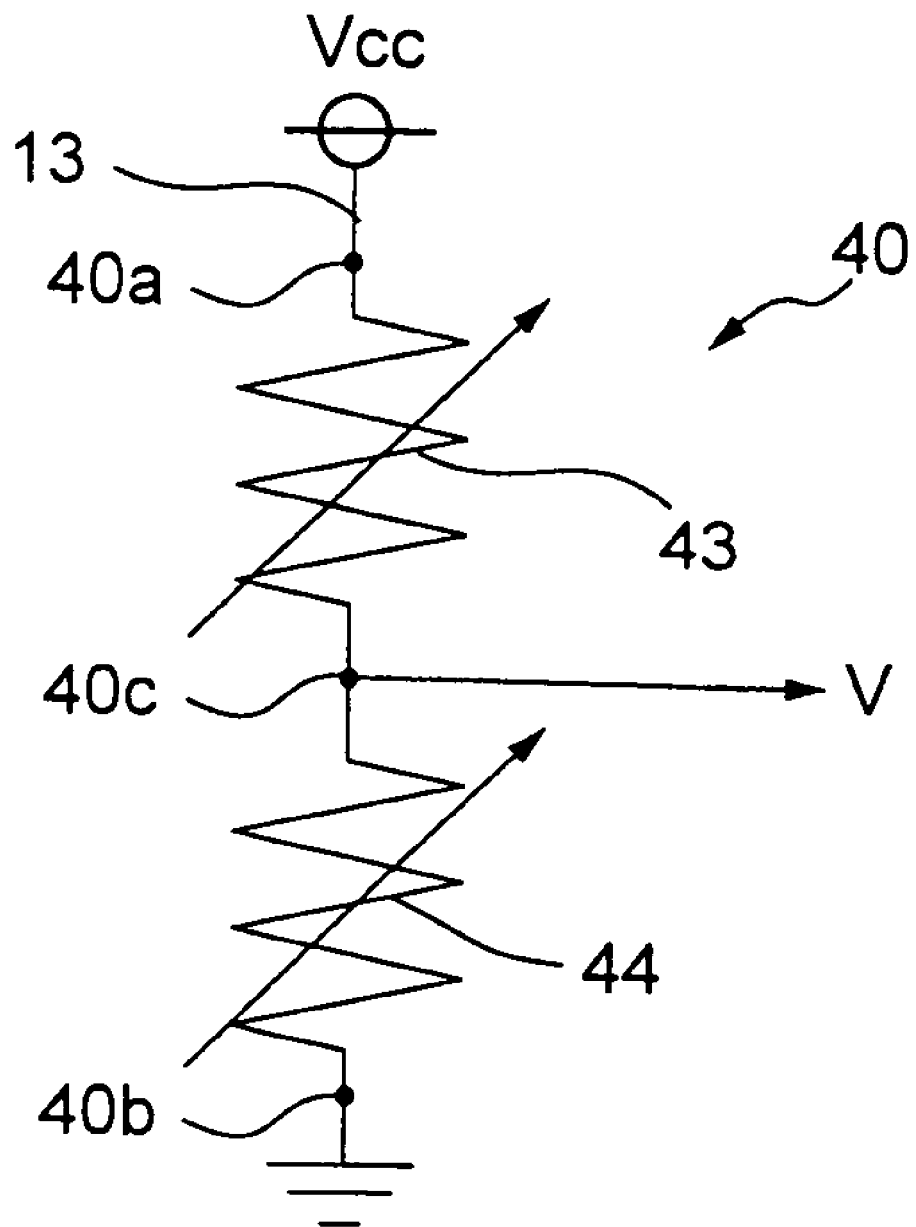
FIG. 16 is a diagram showing the circuit configuration of a resistor.

FIG. 16 is a diagram showing the circuit configuration of the resistor. As shown in this diagram, the resistor 40 is inserted in series in a power supply line 13, where a voltage is applied between the electrodes 40a and 40b. The resistance of resistor 40 is illustrated schematically, as shown in this diagram, the resistor 40 is divided into first and second variable resistors 43 and 44. Among these, the portion of the first variable resistor 43 is in contact, respectively, with the conducting member 50 that moves together with the control key (up directional key) 211a for moving the character in the up direction, and with the conducting member 50 that moves together with the control key (left directional key) 211a for moving the character in the left direction, so its resistance value varies depending on the surface area in contact with these conducting members 50.

In addition, the portion of the second variable resistor 44 is in contact, respectively, with the conducting member 50 that moves together with the control key (down directional key) 211a for moving the character in the down direction, and with the conducting member 50 that moves together with the control key (right directional key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is provided as output from the output terminal 40c.

The output from the output terminal 40c can be calculated from the ratio of the split in resistance value of the first and second variable resistors 43 and 44. For example, if R1 is the resistance value of the first variable resistor 43, R2 is the resistance value of the second variable resistor 44 and $V_{CC}$ is the power supply voltage, then the output voltage V appearing at the output terminal 40c can be expressed by the following equation.

$$V=V_{CC} \times R2/(R1+R2)$$

Figure 17:
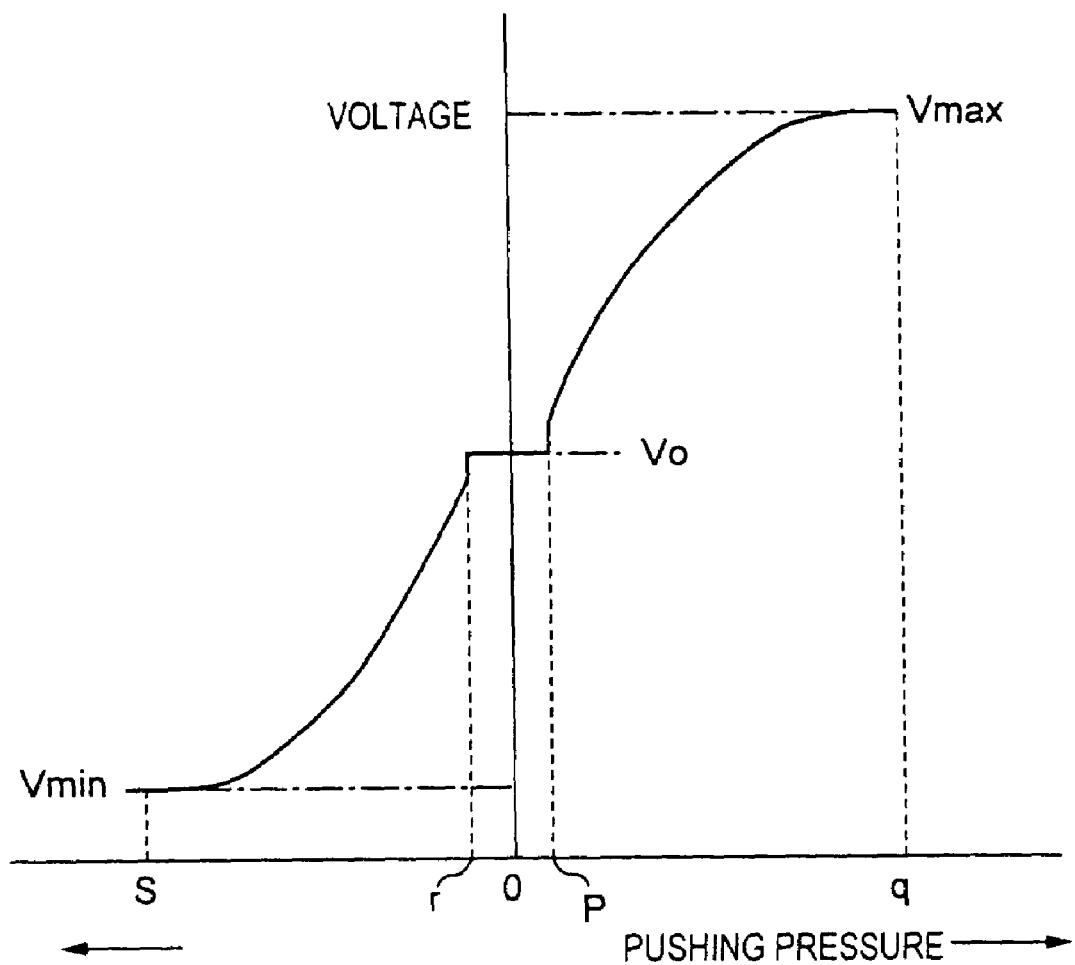
FIG. 17 is a graph showing the characteristic of the output signal.

Therefore, when the resistance value of the first variable resistor 43 decreases, the output voltage increases, but when the resistance value of the second variable resistor 44 decreases, the output voltage also decreases. FIG. 17 is a graph showing the characteristic of the analog signal (voltage) output from the output terminal of the resistor.

First, since a voltage is applied to the resistor 40 when the power is turned on, even if the individual control keys 211a of the control unit 211 are not pressed, a fixed analog signal (voltage) $V_0$ is provided as output from the output terminal 40c (at position 0 in the graph).

Next, even if one of the individual control keys 211a is pressed, the resistance value of this resistor 40 does not change until the conducting member 50 contacts the resistor 40, and the output from the resistor 40 remains unchanged at $V_0$.

Furthermore, if the up directional key or left directional key is pushed until the conducting member 50 comes into contact with the first variable resistor 43 portion of the resistor 40 (at position p in the graph), thereafter the surface area of contact between the conducting member 50 and the first variable resistor 43 portion increases in response to the pushing pressure on the control key 211a (control elements), and thus the resistance of that portion is reduced so the analog signal (voltage) output from the output terminal 40c of the resistor 40 increases. Furthermore, the analog signal (voltage) output from the output terminal 40c of the resistor 40 reaches the maximum $V_{max}$ when the conducting member 50 is most deformed (at position q in the graph).

On the other hand, if the down directional key or right directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control element), and thus the resistance of that portion is reduced, and as a result, the analog signal (voltage) output from the output terminal 40c of the resistor 40 decreases. Furthermore, the analog signal (voltage) output from the output terminal 40c of the resistor 40 reaches the minimum $V_{min}$ when the conducting member 50 is most deformed (at position s in the graph).

Figure 18:
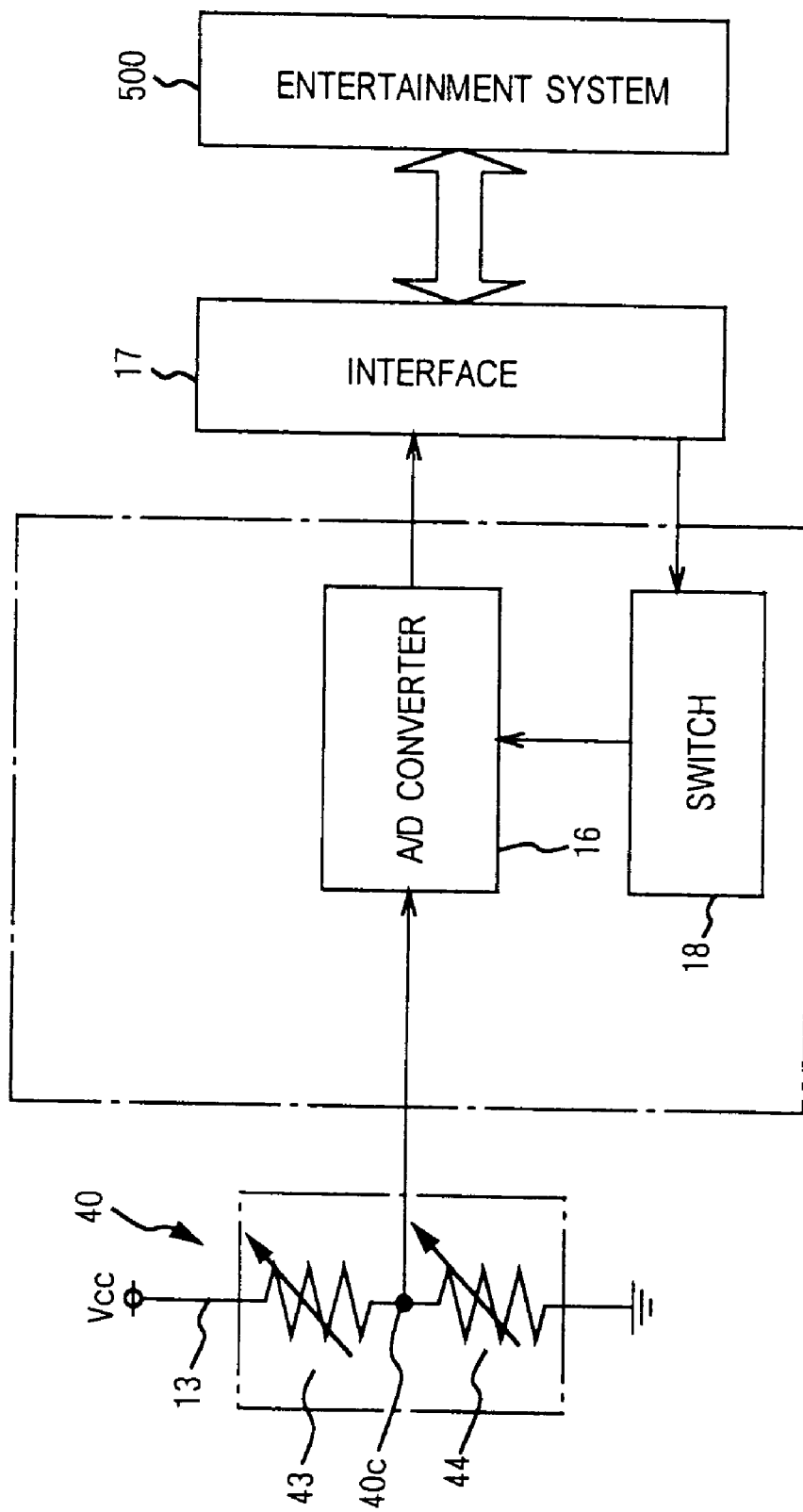
FIG. 18 is a block diagram showing the overall constitution including a resistor.

As shown in FIG. 18, the analog signal (voltage) output from the output terminal 40c of the resistor 40 is provided as input to an A/D converter 16 and converted to a digital signal. Note that the function of the A/D converter 16 shown in FIG. 18 is as described previously based on FIG. 13, so a detailed description shall be omitted here.

Figure 19:
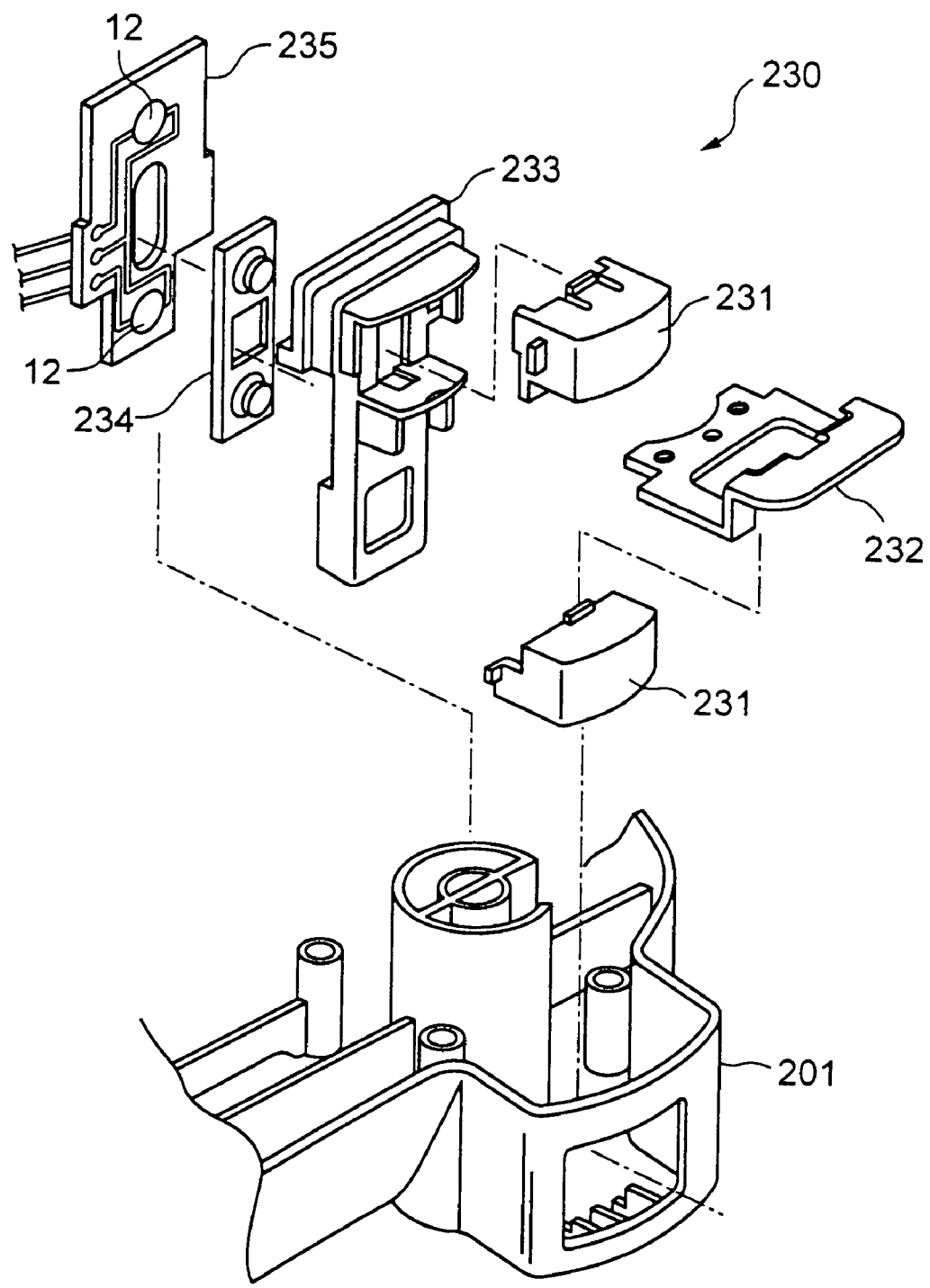
FIG. 19 is an exploded perspective view of the third control part of the controller.

FIG. 19 is an exploded perspective view of an example of the constitution of the third control part of the controller.

The third control part 230 consists of two control buttons 231, a spacer 232 for positioning these control buttons 231 within the interior of the controller 200, a holder 233 that supports these control buttons 231, an elastic body 234 and an internal board 235, having a structure wherein resistors 50 are attached to appropriate locations upon the internal board 235 and conducting members 50 are attached to the rear surface of the elastic body 234.

The overall structure of the third control part 230 also already has been made public knowledge in the publication of unexamined Japanese patent application No. JP-A-H8-163672. However, the individual control buttons 231 can be pushed in while being guided by the spacer 232. The pushing pressure when control buttons are pressed acts via the elastic body 234 on the pressure-sensitive device consisting of a conducting member 50 and resistor 40. The electrical resistance value of the pressure-sensitive device varies depending on the magnitude of the pushing pressure it receives.

It is noted that the fourth control part 240 has the same structure as that of the third control part 230 described above.

Since this preferred embodiment is constituted and functions as described above, differences in pushing pressure due to differences in the strength of users are less reflected as is in the controller output (pressure-sensing values). As a result, it is possible to prevent the problems when such pressure-sensitive controllers are used to execute games and various types of software and the like. Moreover, changes in the pushing speed, namely the rate of change in the magnitude of the pushing force per unit time, or namely changes in the rate of increase or rate of decrease depending on differences in the strength of the user can be kept low.

Moreover, due to this invention, it is possible to provide a novel pressure-sensitive controller that, at the time of execution of various types of programs, gives pressure-sensing values corrected for differences in the user pressure-sensing values.

The invention claimed is:

1. A setup method for a controller that gives instructions to a computer running software depending on a pushing pressure by a user on a control element connected to a pressure-sensitive device of the controller, the method comprising:
   an instruction step wherein the user is instructed to push said control element with at least a maximum strength,
   a storage step wherein a value obtained when said control element is pushed by the user, is stored as the maximum value; and
   a correction step wherein, based on said maximum value and a pressure-sensing value table defined in said software, a new corrected pressure-sensing value table is generated.

2. The setup method of claim 1, wherein the correction step further includes generating various new corrected pressure-sensing values based on said maximum value and various pressure-sensing values defined in said software.

3. The setup method of claim 1, wherein the new corrected pressure-sensing value table is used when the computer executes the software to correct the pushing pressure by the user to a corrected pushing pressure value.

4. A recording medium on which is recorded a computer-readable and executable software program containing a setup program for a controller that gives instructions to a computer running software depending on a pushing pressure of a user on a control element connected to a pressure-sensitive device of the controller; wherein said setup program comprises:
   an instruction step wherein the user is instructed to push said control element with at least a maximum strength;
   a storage step wherein a value obtained when said control element is pushed by the user is stored as the maximum value, and
   a correction step wherein, based on said maximum value and a pressure-sensing value table defined in said software, a new corrected pressure-sensing value table is generated.

5. The recording medium according to claim 4, wherein said corrected pressure-sensing value table or various corrected pressure-sensing values are stored in a storage unit provided internally in or external of said computer.

6. A computer system comprising:
   a pressure-sensitive controller that gives instructions to a computer processor running software depending on a pushing pressure of a user on a control element connected to a pressure-sensitive device of the controller;
   instruction providing means for instructing the user to push said control element with at least a maximum strength;
   storage means for storing a value obtained when said control element is pushed by the user as the maximum value; and
   correction means for generating, based on said maximum value and a pressure-sensing value table defined in software, a new corrected pressure-sensing value table.

7. The computer system according to claim 6, wherein said corrected pressure-sensing value table or various corrected pressure-sensing values are stored in a storage unit internal to or external to said computer.

8. The computer system according to claim 6, which is an entertainment system.

9. The computer system according to claim 7, which is an entertainment system.

10. A computer system comprising:
    a controller that gives instructions to running software depending on a pushing pressure of a user on a control element connected to a pressure-sensitive device of the controller;
    means for measuring a maximum user pressure-sensing value which is the maximum pushing pressure of the user;
    means for acquiring a maximum game pressure-sensing value set by said software; and
    correction means for making said maximum user pressure-sense value to correspond to said maximum game pressure-sense value, and calculating intermediate values until the maximum user pressure-sensing value is reached proportionally corresponding to the game pressure-sensing values;
    wherein the user pressure-sensing value which is the pushing pressure of the user on the control element is corrected by said correction means and used in said software.

11. The computer system according to claim 10, wherein said correction means has a correction table for correcting said user pressure-sensing values to said game pressure-sensing values.

12. The computer system according to claim 11, wherein said correction table is prepared based on a stipulated program.

13. The computer system according to claim 11, wherein said correction table is prepared based on predetermined calculations.

14. A computer system comprising:
a controller that gives instructions to running software depending on a pushing pressure of a user on a control element connected to a pressure-sensitive device of said controller;
means for measuring user pressure-sensing values which are pushing pressures of the user;
means for acquiring game pressure-sensing values set by said software; and
correction means for correcting said user pressure-sensing values to correspond to game pressure-sense values based on a stipulated function;
wherein the user pressure-sensing value which is the pushing pressure of the user on the control element is corrected by said correction means and used in said software.

15. The computer system according to claim 14, wherein said correction means has a correction table for correcting said user pressure-sensing values to correspond to said game pressure-sensing values based on said stipulated function.

16. The computer system according to claim 15, wherein said correction table is prepared based on a stipulated program.

17. The computer system according to claim 15, wherein said correction table is prepared based on predetermined calculations.

18. The computer system according to claim 14, wherein said stipulated function is selected from a group consisting of second-order functions, higher-order functions, exponential functions and trigonometric functions, depending on characteristics of the instructions controlled by said control element.

19. A computer system comprising:
a controller that gives instructions to running software depending on a pushing pressure of a user on a control element connected to a pressure-sensitive device of said controller;
means for measuring a maximum user pressure-sensing value rate of change which is the most rapid pushing pressure of the user;
means for acquiring a maximum game pressure-sensing value rate of change set by said software, and
correction means for making said maximum user pressure-sensing value rate of change to correspond to said maximum game pressure-sensing value rate of change, and calculating intermediate values until the maximum user pressure-sensing value rate of change is reached proportionally corresponding to the game pressure-sensing value rate of change;
wherein the user pressure-sensing value rate of change which is a pushing speed of the user on the control element is corrected by said correction means and used in said software.

20. The computer system according to claim 19, wherein said correction means has a correction table for correcting said user pressure-sensing value rate of change to correspond to said game pressure-sensing value rate of change.

21. The computer system according to claim 20, wherein said correction table is prepared based on a stipulated program.

22. The computer system according to claim 20, wherein said correction table is prepared based on predetermined calculations.

23. A setup method for a controller that gives instructions to a computer running software depending on a pushing pressure of a user on a control element connected to a pressure-sensitive device of the controller, the setup method comprising the steps of:
measuring a maximum user pressure-sensing value which is the maximum pushing pressure of the user;
acquiring a maximum game pressure-sensing value set by said software; and
performing a correction step whereby said maximum user pressure-sensing value is made to correspond to said maximum game pressure-sensing value, and intermediate values until the maximum user pressure-sensing value is reached are calculated proportionally corresponding to the game pressure-sensing values; wherein
the user pressure-sensing value which is the pushing pressure of the user on the control element is corrected by said correction means and used in said software.

24. The setup method according to claim 23, wherein said correction means has a correction table for correcting said user pressure-sensing values to correspond to said game pressure-sensing values.

25. The setup method according to claim 24, wherein said correction table is prepared based on a stipulated program.

26. A setup method for a controller that gives instructions to a computer running software depending on a pushing pressure of a user on a control element connected to a pressure-sensitive device of the controller, the setup method comprising the steps of:
measuring a user pressure-sensing value which is the pushing pressure of the user;
acquiring a game pressure-sensing value set by said software; and
performing a correction step whereby said user pressure-sensing value is corrected to correspond to said game pressure-sensing value; wherein
the user pressure-sensing value which is the pushing pressure of the user on the control element is corrected by said correction step and used in said software.

27. The setup method according to claim 26, wherein said correction step a correction table issued for correcting said user pressure-sensing values to correspond to said game pressure-sensing values.

28. The setup method according to claim 27, wherein said correction table is prepared based on a stipulated function.

29. The setup method according to claim 28, wherein said stipulated function is selected from a group consisting of second-order functions, higher-order functions, exponential functions and trigonometric functions, depending on characteristics of the instructions controlled by said control element.

30. The setup method according to claim 27, wherein said correction table is prepared based on a stipulated program.

31. The computer system according to claim 27, wherein said correction table is prepared based on predetermined calculations.

32. A setup method for a controller that gives instructions to a computer running software depending on a pushing pressure of a user on a control element connected to a pressure-sensitive device of the controller, the setup method comprising the steps of:

measuring a maximum user pressure-sensing value rate of change which is the most rapid pushing pressure of the user, acquiring a maximum game pressure-sensing value rate of change set by said software; and performing a correction step whereby said maximum user pressure-sensing value rate of change is made to correspond to said maximum game pressure-sensing value rate of change, and intermediate values until the maximum user pressure-sensing value rate of change is reached are calculated proportionally corresponding to the game pressure-sensing value rate of change; wherein the user pressure-sensing value rate of change which is the pushing speed of the user on the control element is corrected by said correction means and used in said software.

33. The setup method according to claim 32, wherein said correction means has a correction table for correcting said user pressure-sensing value rate of change to correspond said game pressure-sensing value rate of change.

34. The setup method according to claim 33, wherein said correction table is prepared based on a stipulated program.

35. The setup method according to claim 33, wherein said correction table is prepared based on predetermined calculations.

36. A recording medium on which is recorded a computer-readable and executable software program containing a setup program for a controller that gives instructions to a computer running software depending on a pushing pressure of a user on a control element connected to a pressure-sensitive device of the controller, said setup program comprising the steps of:

measuring a maximum user pressure-sensing value which is the maximum pushing pressure of the user;

acquiring a maximum game pressure-sensing value set by said software; and performing correction to make said maximum user pressure-sensing value to correspond to said maximum game pressure-sensing value, and calculate intermediate values until the maximum user pressure-sensing value is reached proportionally corresponding to the game pressure-sensing values.

37. A recording medium on which is recorded a computer-readable and executable software program containing a setup program for a controller that gives instructions to a computer running software depending on a pushing pressure by a user on a control element connected to a pressure-sensitive device of the controller, said setup program comprising the steps of:

measuring user pressure-sensing values which are the pushing pressures of the user;

acquiring game pressure-sensing values set by said software; and performing correction to correct said user pressure-sensing values to correspond to game pressure-sensing values based on a stipulated function.

38. A recording medium on which is recorded a computer-readable and executable software program containing a setup program for a controller that gives instructions to a computer running software depending on a pushing pressure of a user on a control element connected to a pressure-sensitive device of the controller, said setup program comprising the steps of:

measuring a maximum user pressure-sensing value rate of change which is the most rapid pushing pressure of the user, acquiring a maximum game pressure-sensing value rate of change set by said software; and performing correction to make said maximum user pressure-sensing value rate of change to correspond to said maximum game pressure-sensing value rate of change, and calculate intermediate values until the maximum user pressure-sensing value rate of change is reached proportionally corresponding to the game pressure-sensing value rate of change.

* * * * *